US008922793B2

(12) United States Patent
Machida

(10) Patent No.: US 8,922,793 B2
(45) Date of Patent: Dec. 30, 2014

(54) CONTROL DEVICE, CONTROL METHOD, IMAGE FORMING APPARATUS, AND NON-TRANSITORY COMPUTER READABLE MEDIUM STORING PROGRAM

(75) Inventor: Masahiro Machida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 265 days.

(21) Appl. No.: 13/237,158

(22) Filed: Sep. 20, 2011

(65) Prior Publication Data

US 2012/0243017 A1    Sep. 27, 2012

(30) Foreign Application Priority Data

Mar. 25, 2011    (JP) ................................. 2011-066867

(51) Int. Cl.
*G06F 3/12*    (2006.01)
*H04N 1/60*    (2006.01)
*G06F 3/048*   (2013.01)
*H04N 1/00*    (2006.01)

(52) U.S. Cl.
CPC ....... *H04N 1/00503* (2013.01); *H04N 1/00514* (2013.01); *H04N 1/00973* (2013.01); *G06F 3/1204* (2013.01); *G06F 3/1205* (2013.01); *G06F 3/1257* (2013.01); *G06F 3/1271* (2013.01); *G06F 3/1285* (2013.01); *G06F 3/1291* (2013.01)
USPC ........................... 358/1.13; 358/1.9; 715/824

(58) Field of Classification Search
None
See application file for complete search history.

(56) References Cited

FOREIGN PATENT DOCUMENTS

JP           06-309133 A        11/1994

*Primary Examiner* — Thomas Lett
(74) *Attorney, Agent, or Firm* — Sughrue Mion, PLLC

(57) ABSTRACT

A control device includes: a search request receiving unit that receives a request to search for a first operation screen registered in a second image forming apparatus connected to a first image forming apparatus; a search unit that searches for the first operation screen among operation screens registered in the second image forming apparatus; a display control unit that controls to display the first operation screen on a display device provided in the first image forming apparatus; a receiver that receives an instruction for the second image forming apparatus having the first operation screen registered therein from a user through the first operation screen displayed on the display device; and a transmitter that transmits the instruction received from the user through the first operation screen to the second image forming apparatus having the first operation screen registered therein.

7 Claims, 22 Drawing Sheets

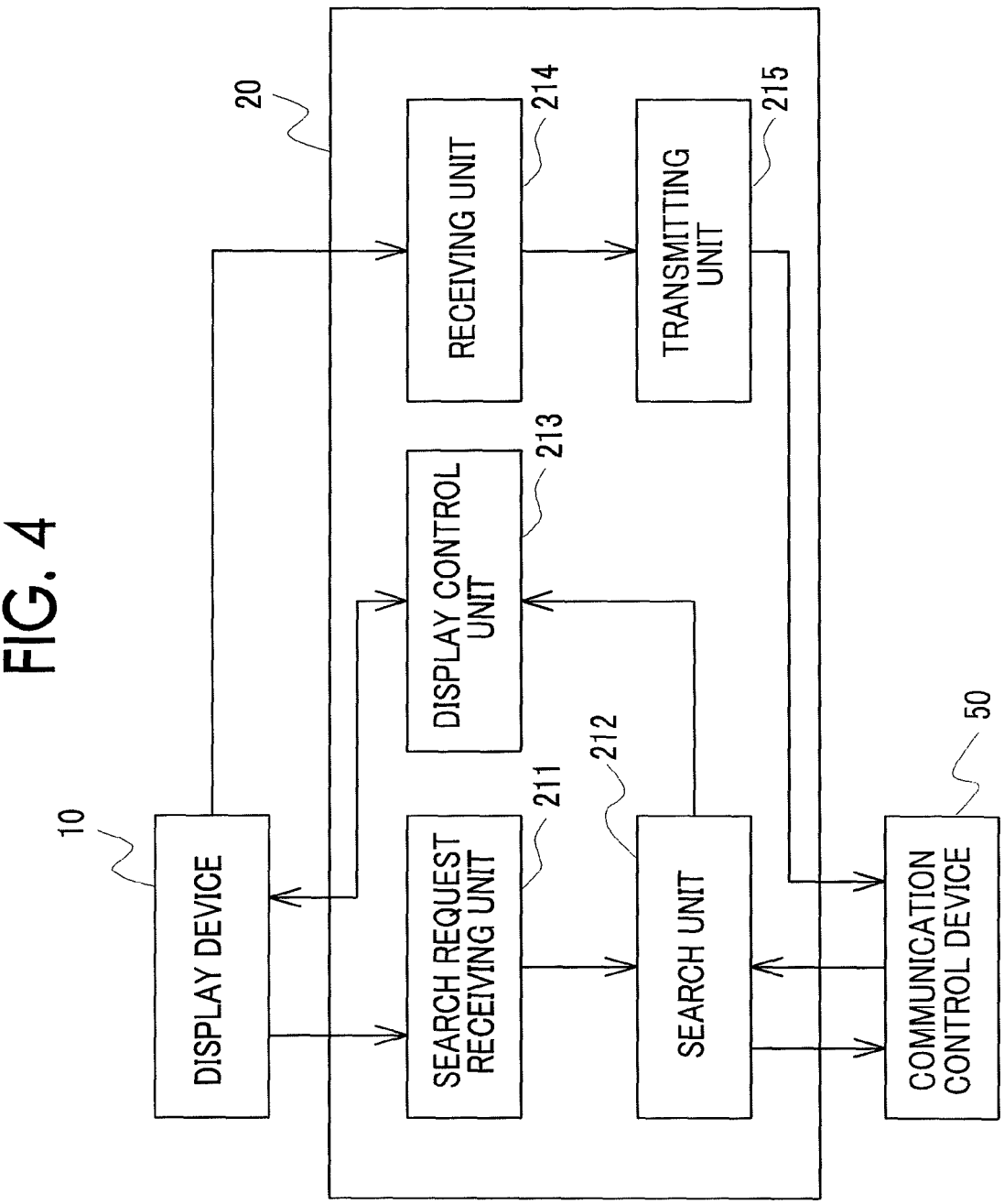

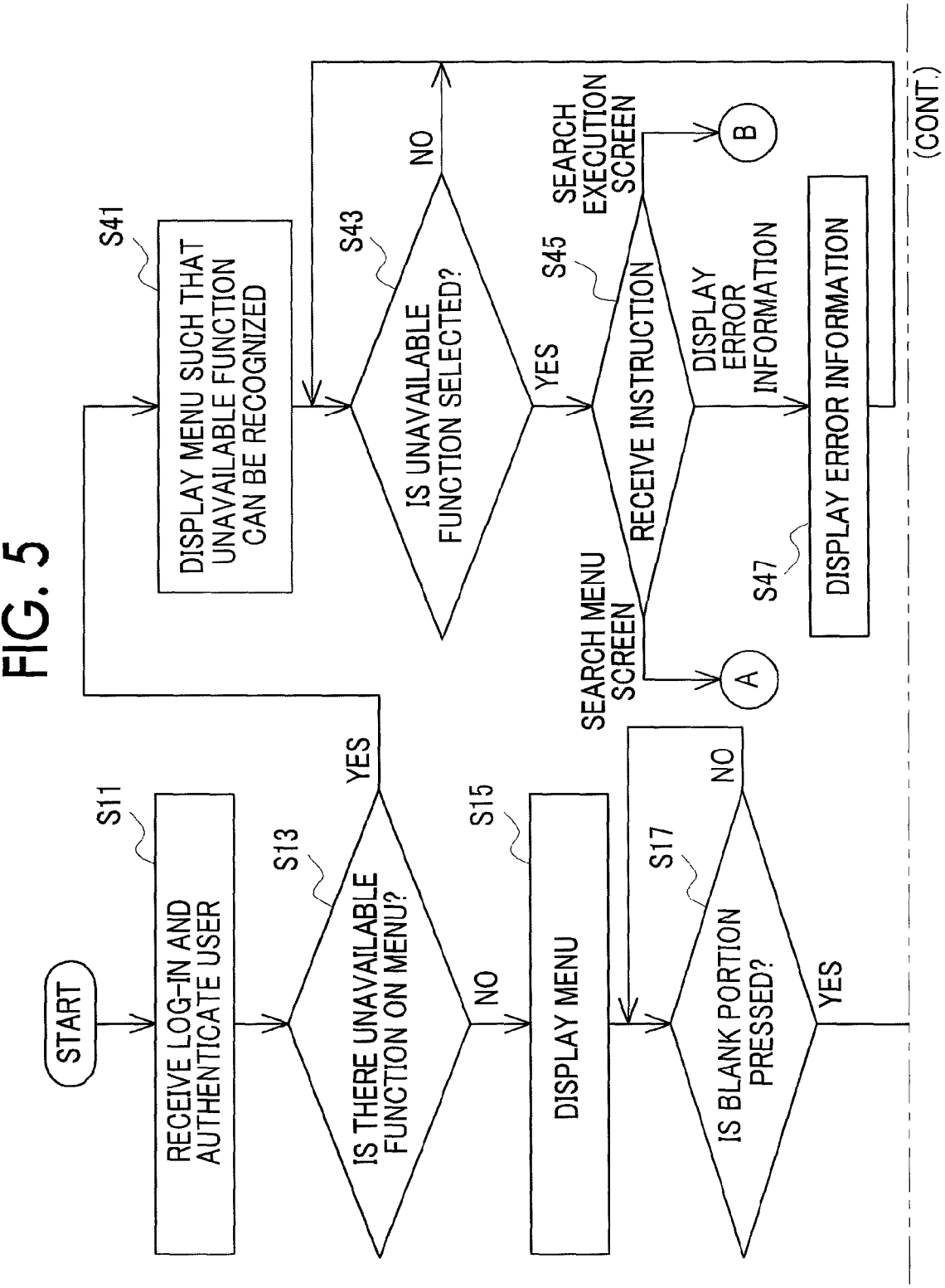

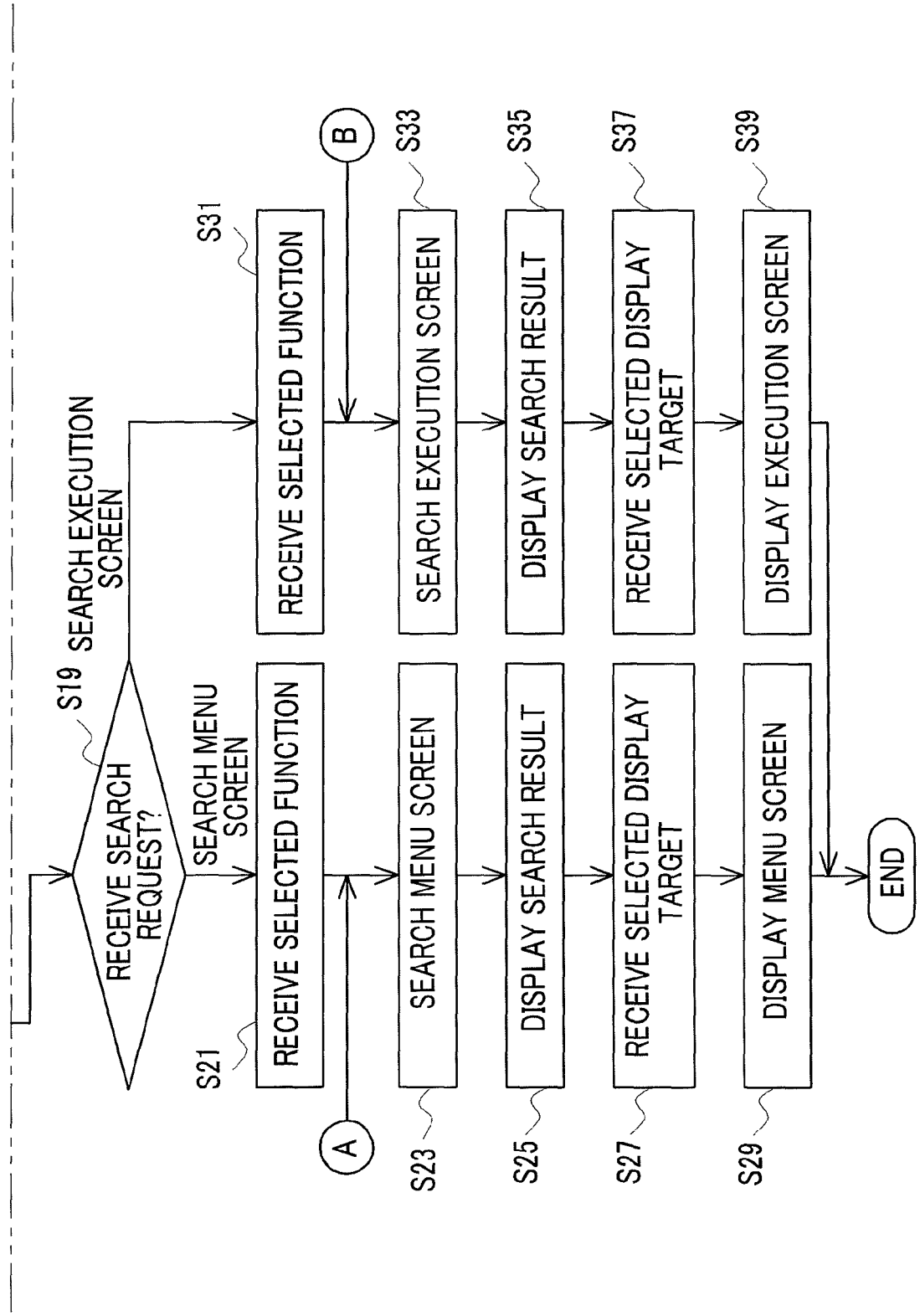

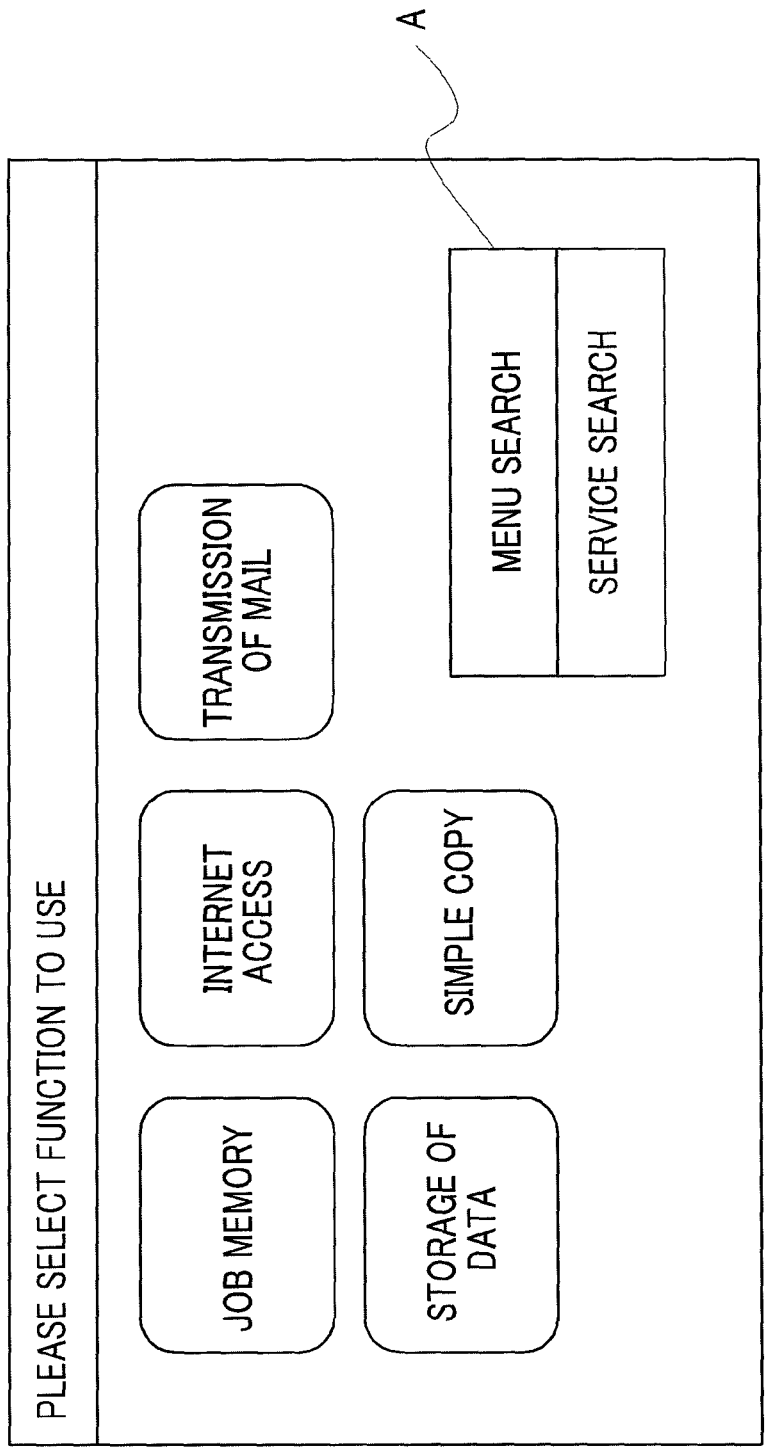

FIG. 6B

| CUSTOM MENU SEARCH | | | CLOSE |
|---|---|---|---|

CUSTOM MENUS HAVING SELECTED SERVICE SET THEREIN ARE SEARCHED. PLEASE SELECT DESIRED CUSTOM MENU.

| MENU NAME | MACHINE NAME | OWNER | UPDATE DATE |
|---|---|---|---|
| MyMenu1 | MACHINE 2 | ADMINISTRATOR | 20yymmdd |
| MyMenu2 | MACHINE 2 | TARO FUJI | 20yymmdd |
| MyMenu3 | MACHINE 3 | HANAKO FUJI | 20yymmdd |

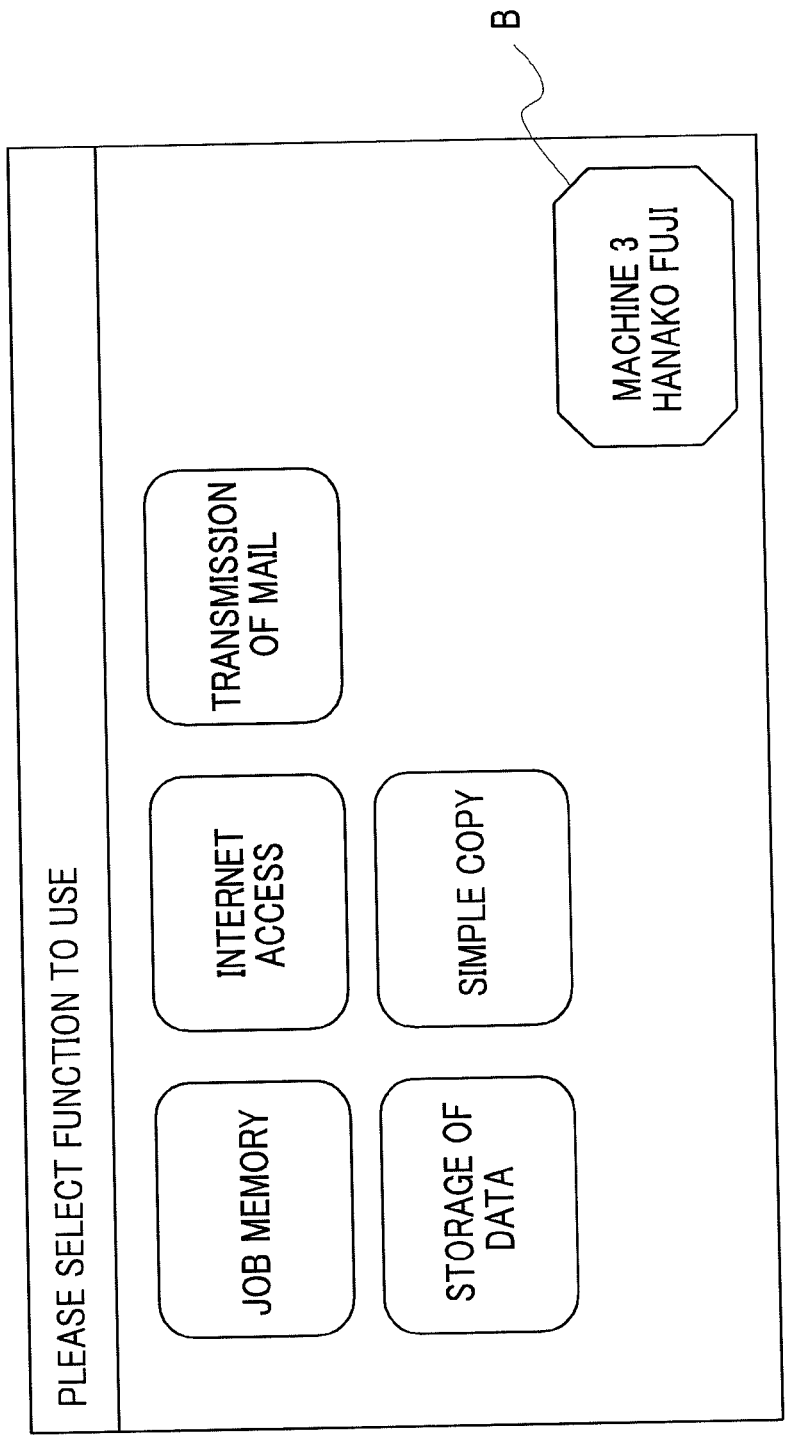

FIG. 7A

CUSTOM SERVICE SEARCH

PLEASE SELECT DESIRED CUSTOM MENU

[CLOSE]

| SERVICE NAME | MENU NAME | MACHINE NAME | OWNER | UPDATE DATE |
|---|---|---|---|---|
| SIMPLE COPY | MyMenu1 | MACHINE 2 | TARO AOKI | 20yymmdd |
| SIMPLE COPY | MyMenu2 | MACHINE 2 | TARO AMANO | 20yymmdd |
| SIMPLE COPY | MyMenu3 | MACHINE 3 | TARO ISHIYAMA | 20yymmdd |
| SIMPLE COPY | MyMenu4 | MACHINE 3 | HANAKO KETABA | 20yymmdd |
| SIMPLE COPY | MyMenu9 | MACHINE 3 | HANAKO TOUSE | 20yymmdd |

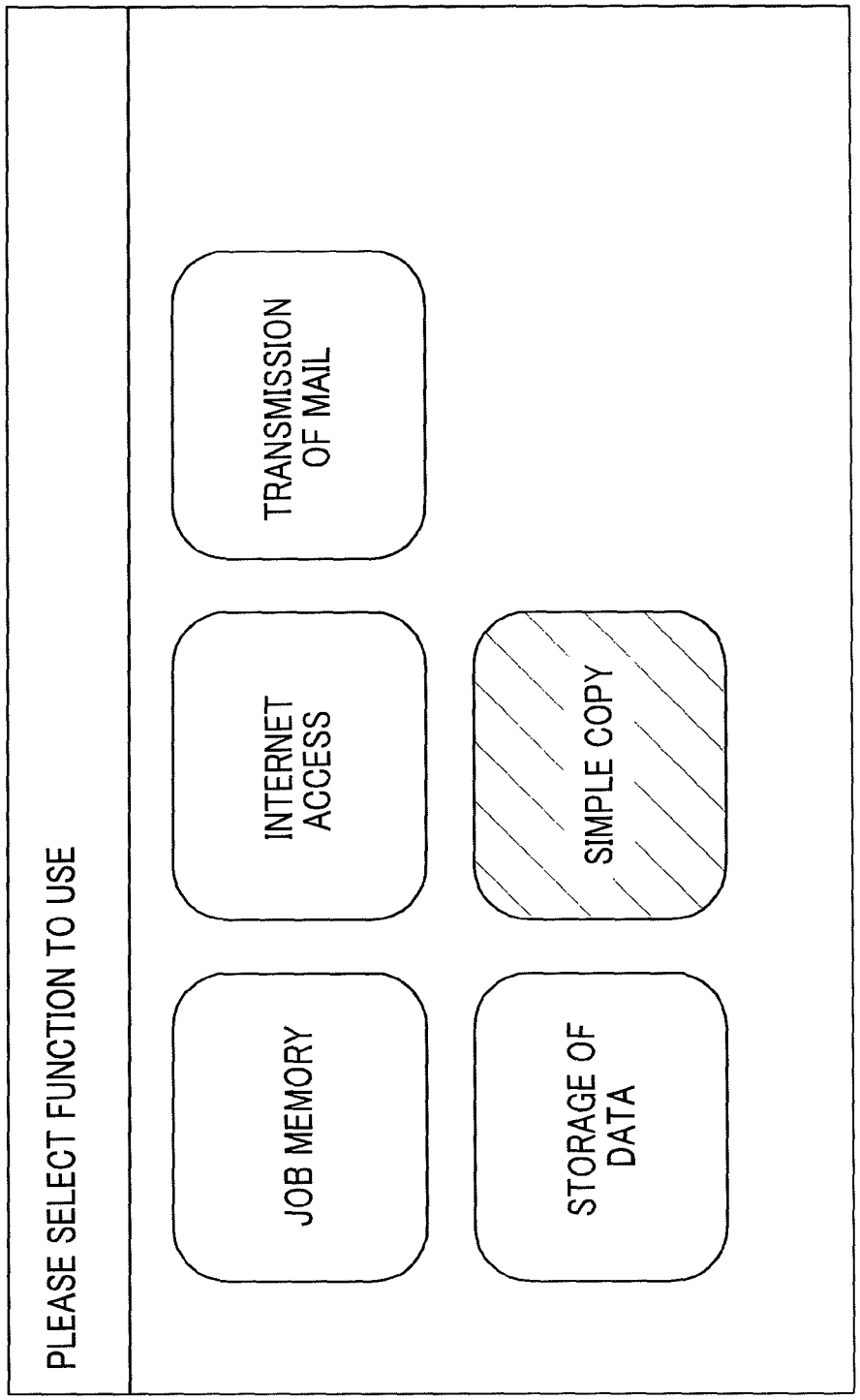

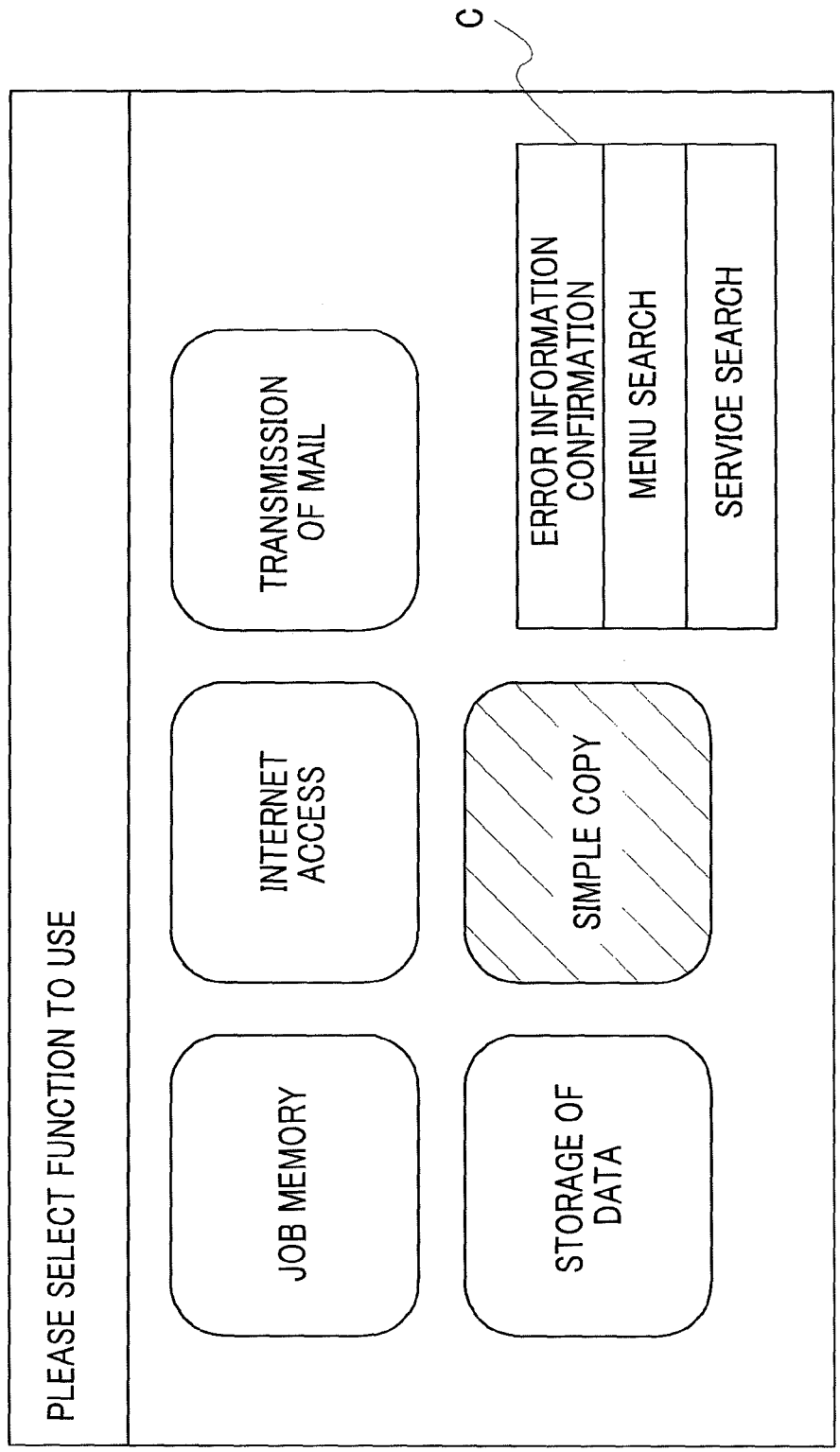

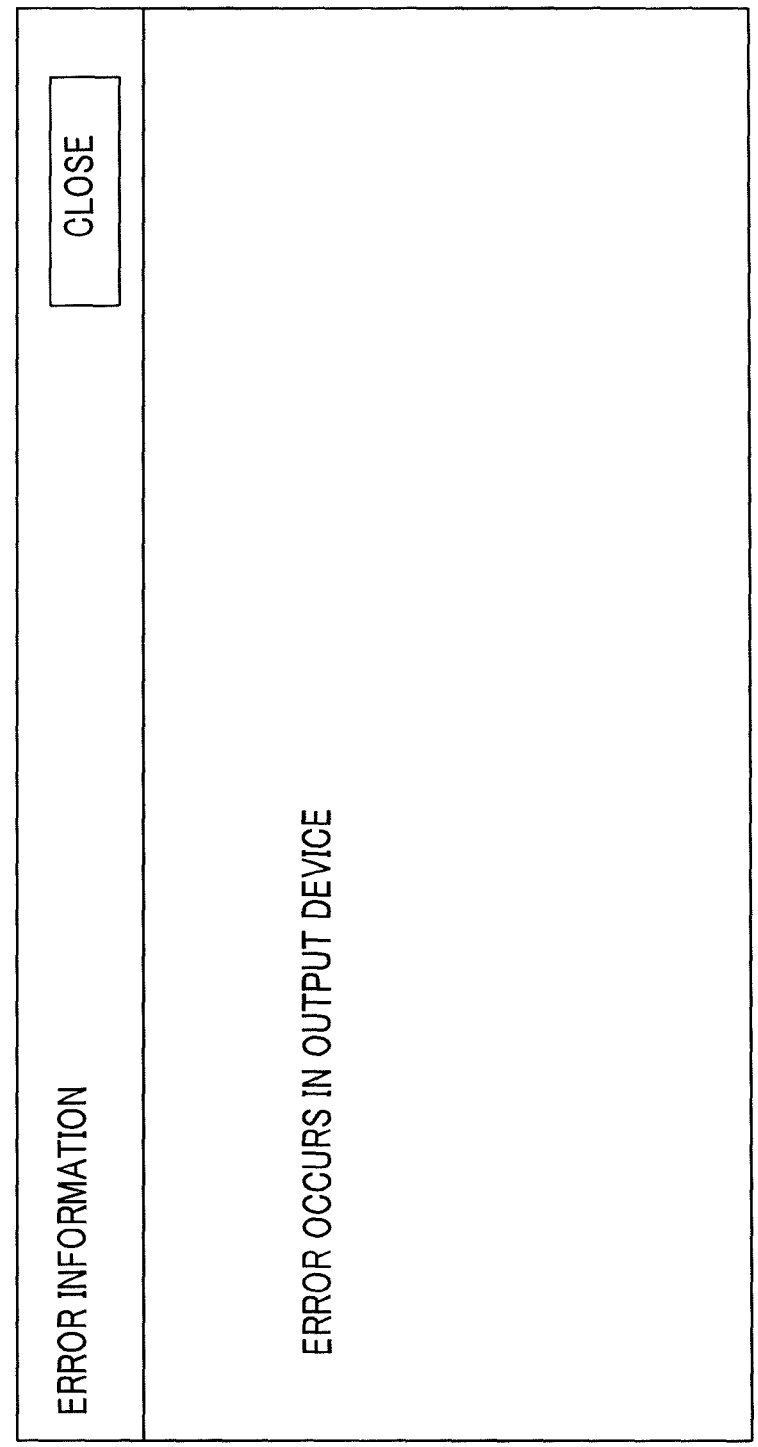

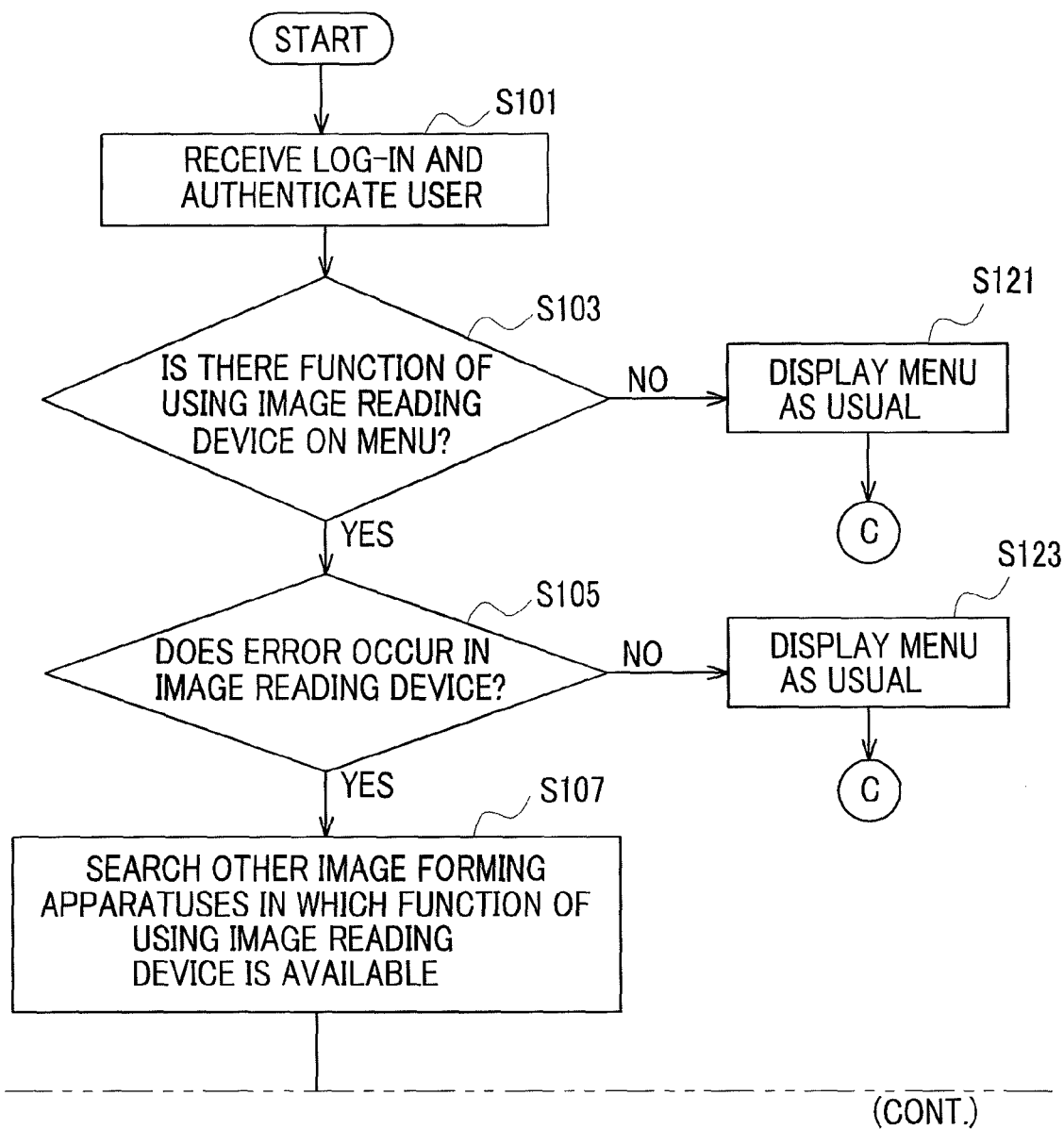

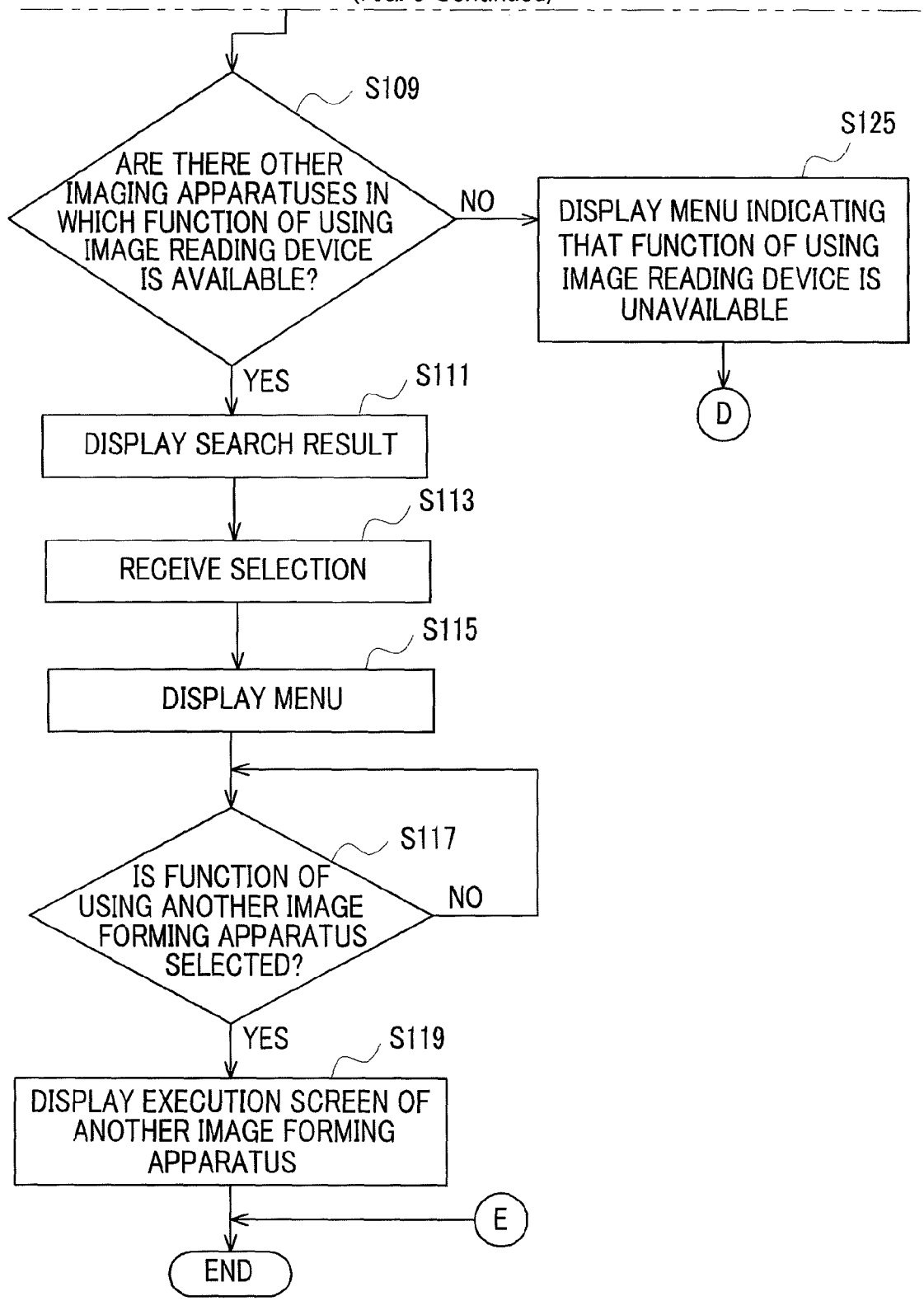

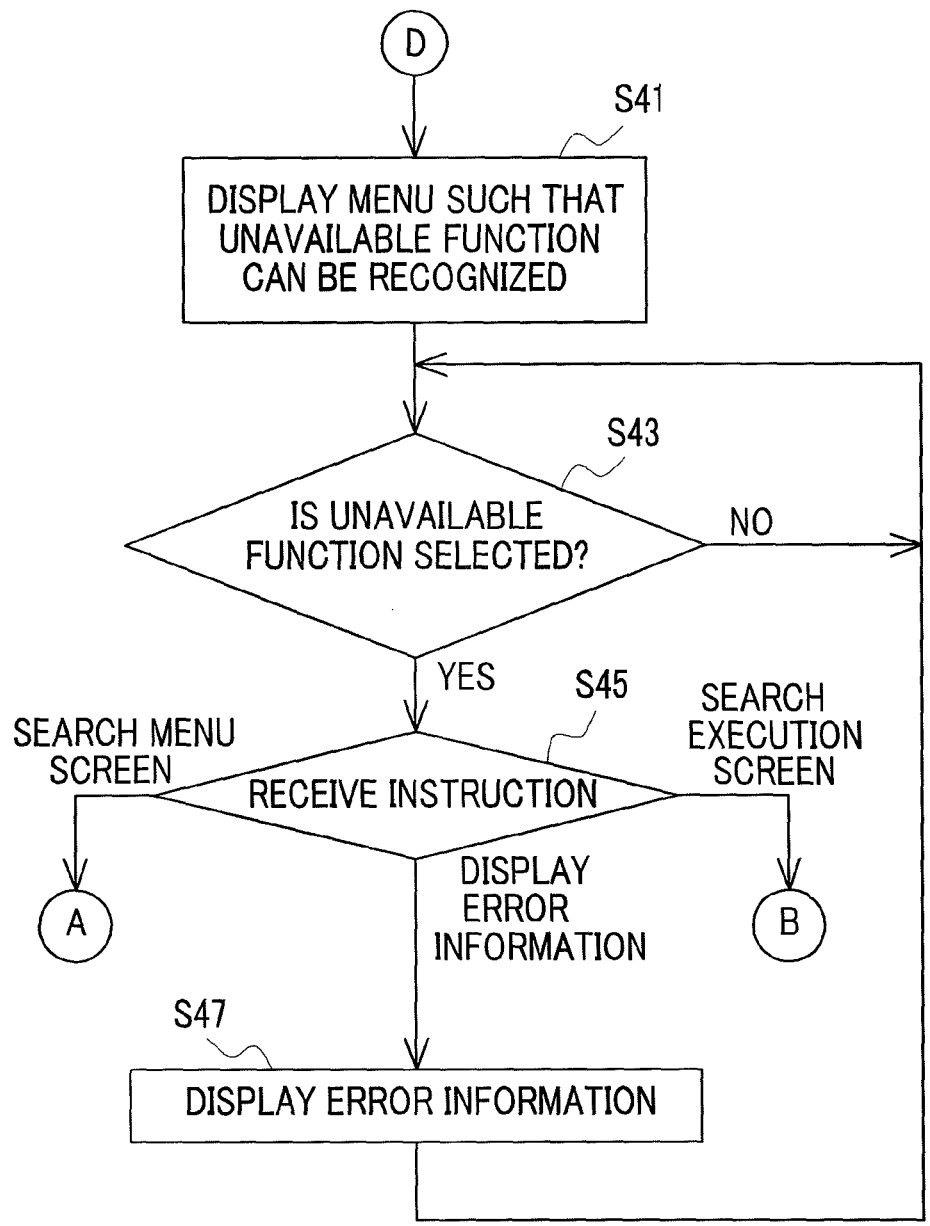

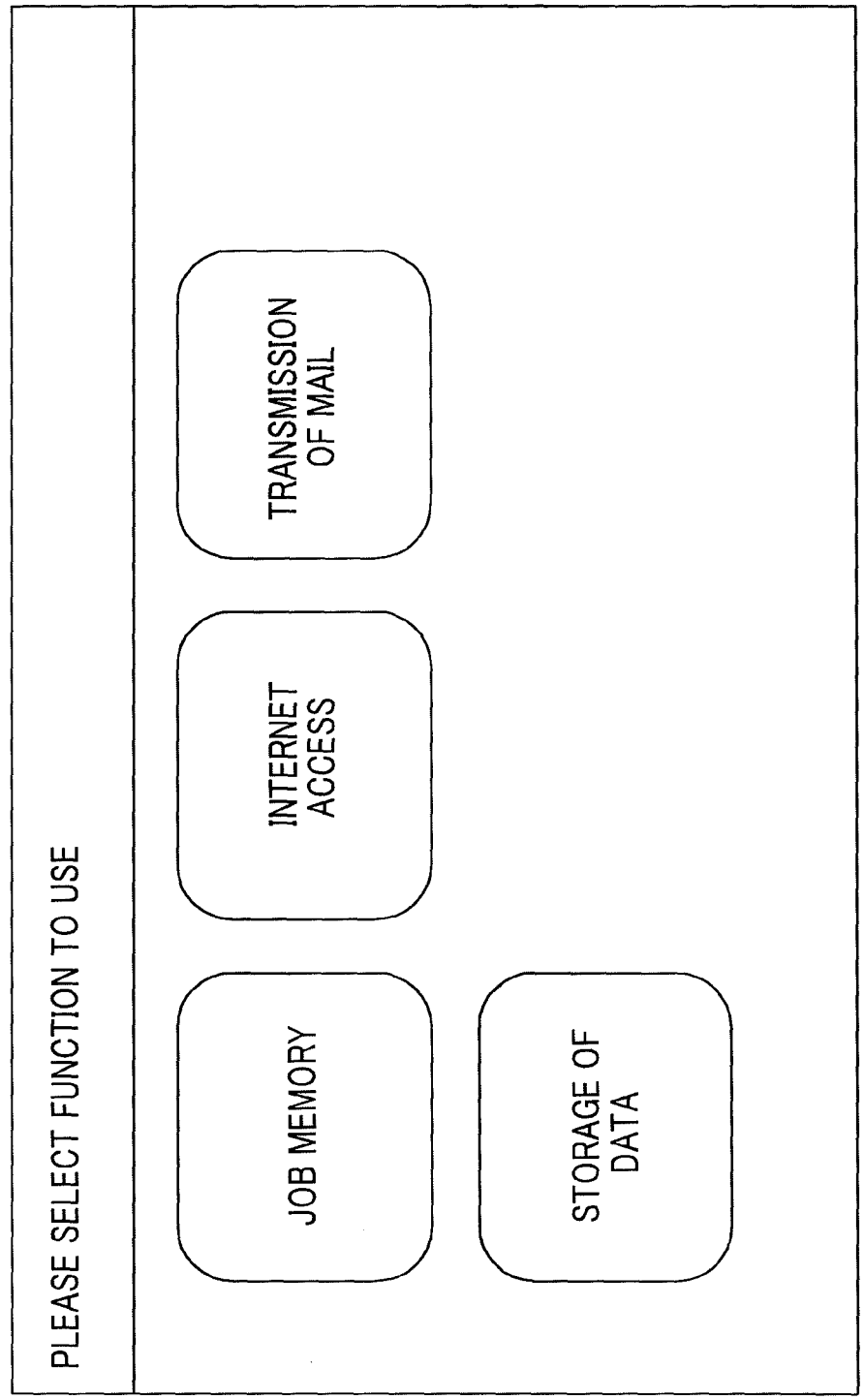

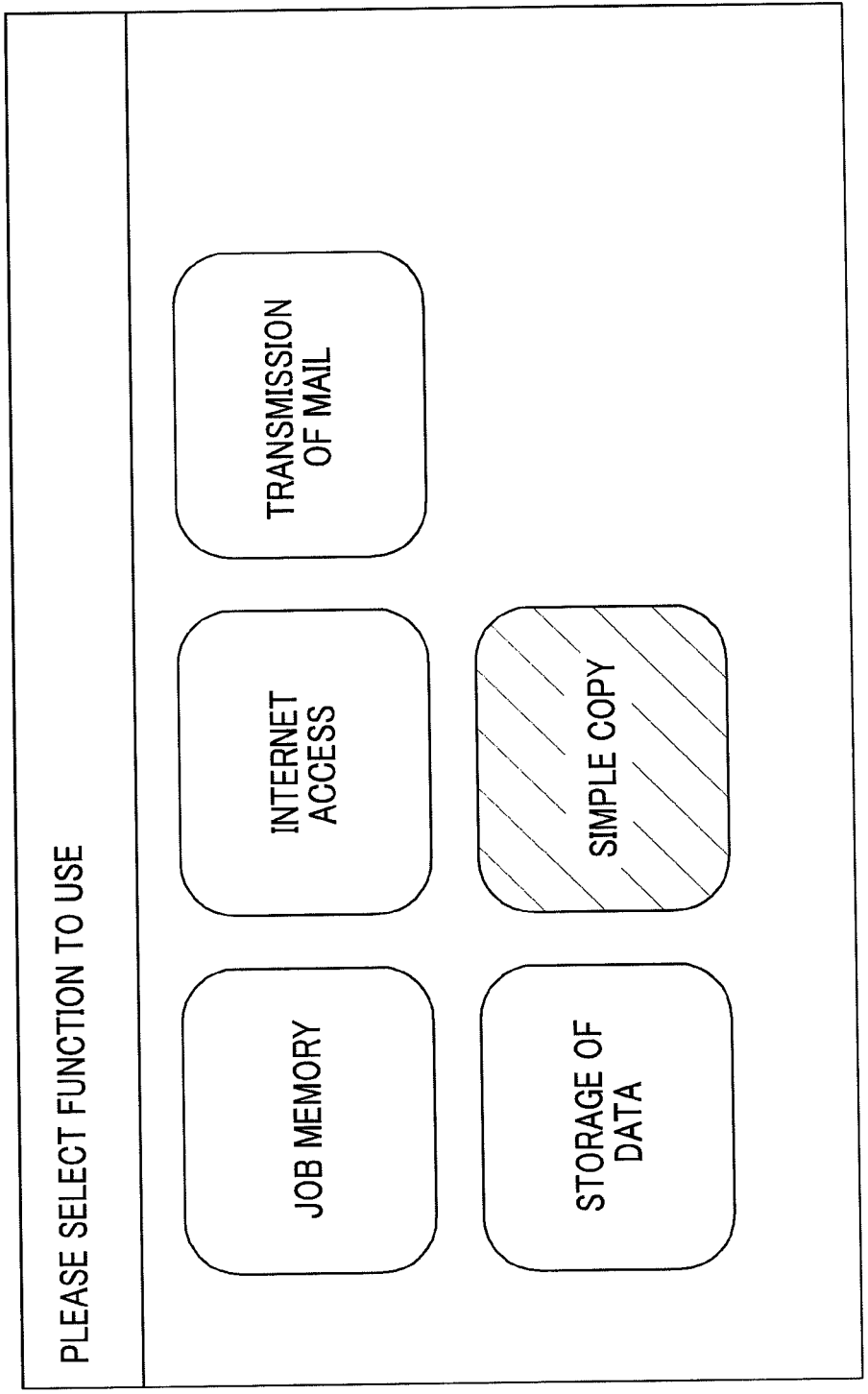

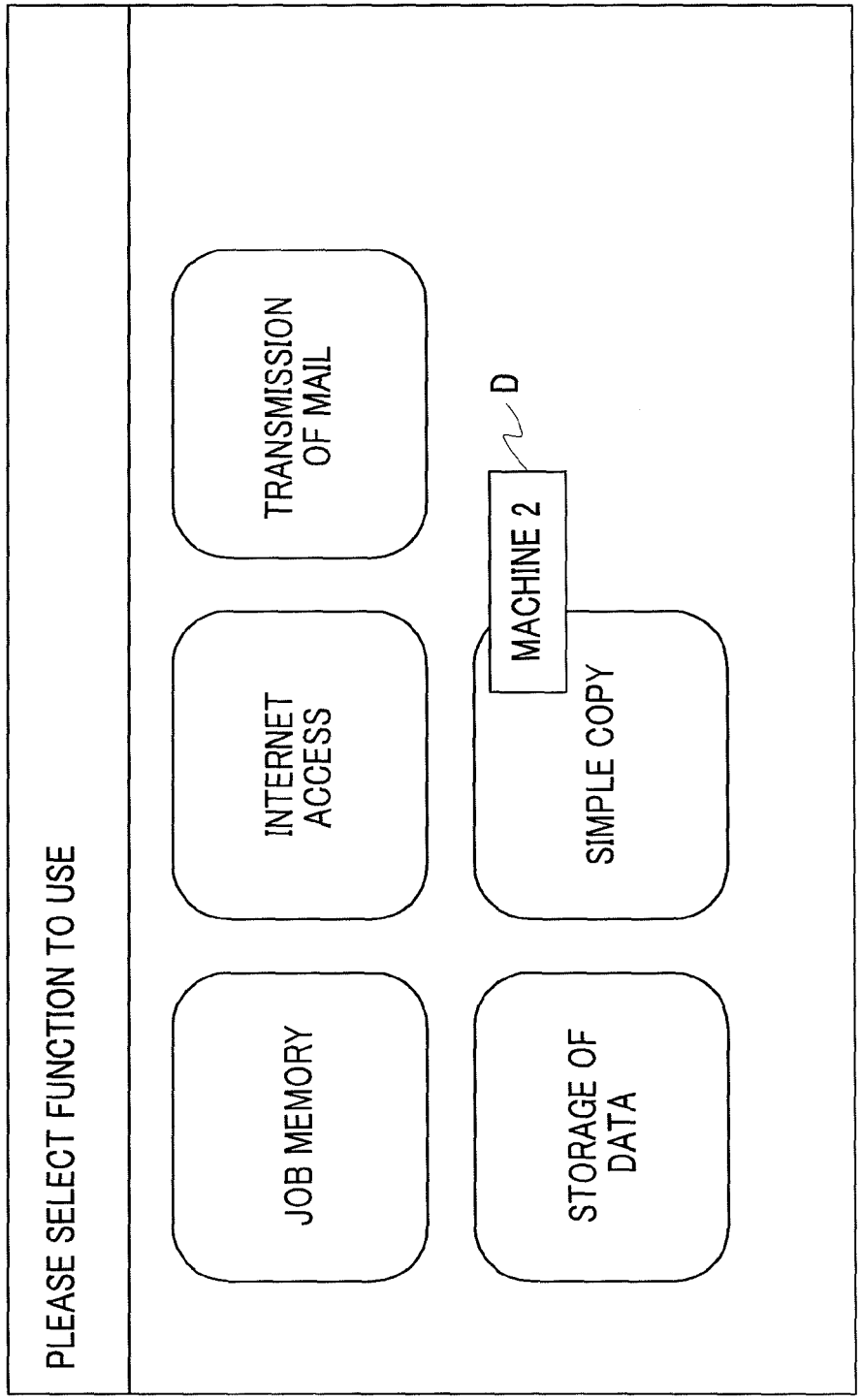

CONTROL DEVICE, CONTROL METHOD, IMAGE FORMING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2011-066867 filed Mar. 25, 2011.

BACKGROUND (i) Technical Field

The present invention relates to a control device, a control method, an image forming apparatus, and a non-transitory computer readable medium storing program.

(ii) Related Art

In recent years, an image forming apparatus has been proposed in which an operation screen (a menu screen or a function execution screen) that is displayed on a display device of the image forming apparatus and receives an operation for the image forming apparatus from the user may be registered for each user or each group (for example, each department).

SUMMARY

According to an aspect of the invention, there is provided a control device including: a search request receiving unit that receives a request to search for a first operation screen registered in a second image forming apparatus connected to a first image forming apparatus; a search unit that searches for the first operation screen among operation screens registered in the second image forming apparatus; a display control unit that controls to display the first operation screen on a display device provided in the first image forming apparatus; a receiving unit that receives an instruction for the second image forming apparatus having the first operation screen registered therein from a user through the first operation screen displayed on the display device; and a transmitting unit that transmits the instruction received from the user through the first operation screen to the second image forming apparatus having the first operation screen registered therein.

BRIEF DESCRIPTION OF THE DRAWINGS

Exemplary embodiments of the present invention will be described in detail based on the following figures, wherein:

FIG. 4 is a functional block diagram illustrating an example of the function of the control device;

FIG. 5 is a flowchart illustrating an example of the process of the control device;

FIGS. 6A to 6C are diagrams illustrating an example of a screen displayed on a display device;

FIGS. 7A and 7B are diagrams illustrating an example of the screen displayed on the display device;

FIGS. 8A to 8C are diagrams illustrating an example of the screen displayed on the display device;

FIG. 9 is a flowchart illustrating an example of the process of a control device according to a second exemplary embodiment;

FIGS. 11A to 11D are diagrams illustrating an example of a screen displayed on a display device.

DETAILED DESCRIPTION

Hereinafter, exemplary embodiments of the invention will be described with reference to the accompanying drawings.

First Exemplary Embodiment

Figure 1:
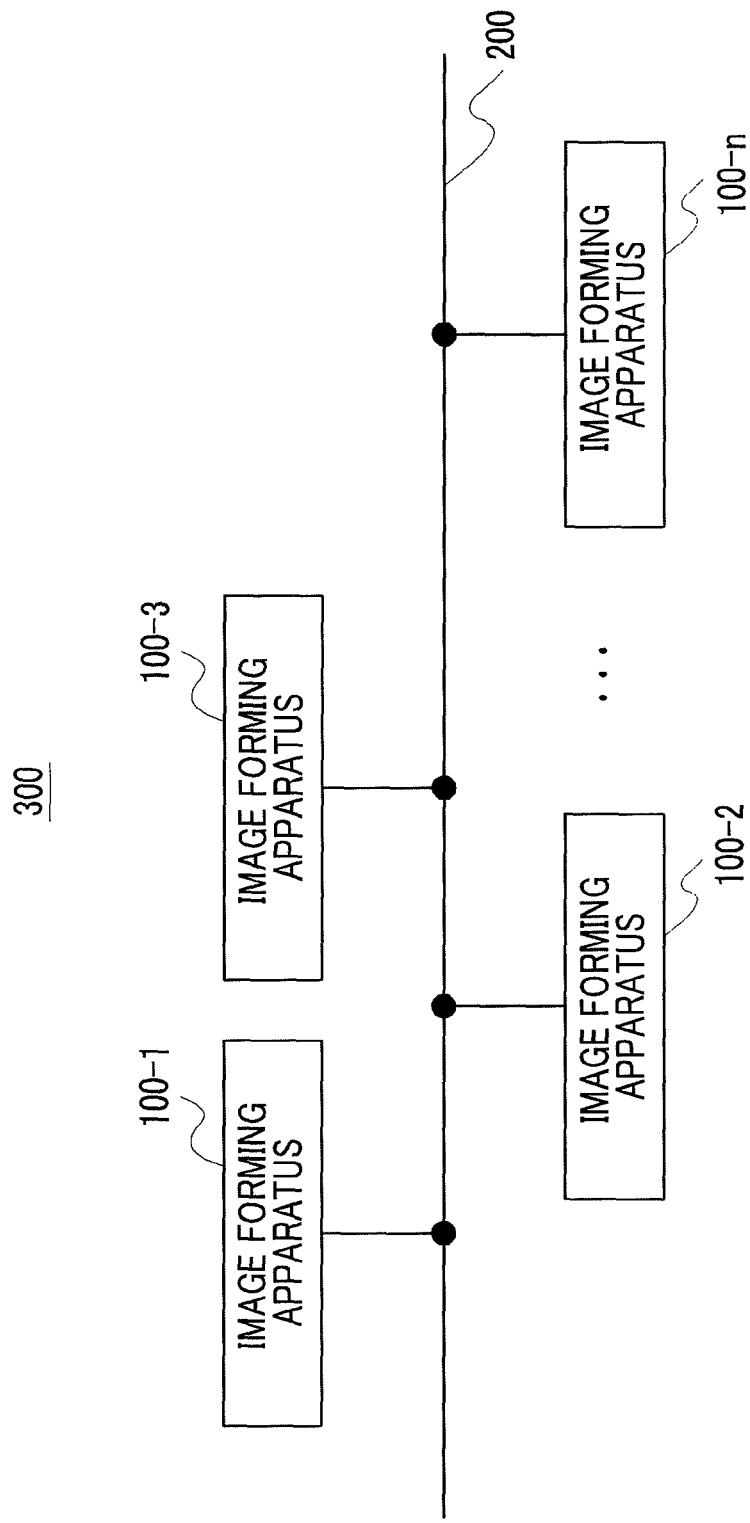
FIG. 1 is a diagram illustrating an example of the structure of an image forming system including an image forming apparatus according to an exemplary embodiment of the invention.

FIG. 1 is a diagram illustrating an example of the structure of an image forming system including an image forming apparatus according to a first exemplary embodiment of the invention. As shown in FIG. 1, an image forming system 300 includes image forming apparatuses 100-1 to 100-n. The image forming apparatuses 100-1 to 100-n are, for example, printers, copiers, or facsimiles. The image forming apparatuses 100-1 to 100-n may be so-called multi-function machines having plural functions, such as a print function, a copy function, and a facsimile function. The image forming apparatuses 100-1 to 100-n are connected to each other through a communication unit 200 so as to communicate with each other. In the following description, when it is not necessary to particularly discriminate the image forming apparatuses 100-1 to 100-n, the image forming apparatuses 100-1 to 100-n are referred to as image forming apparatuses 100.

Figure 2:
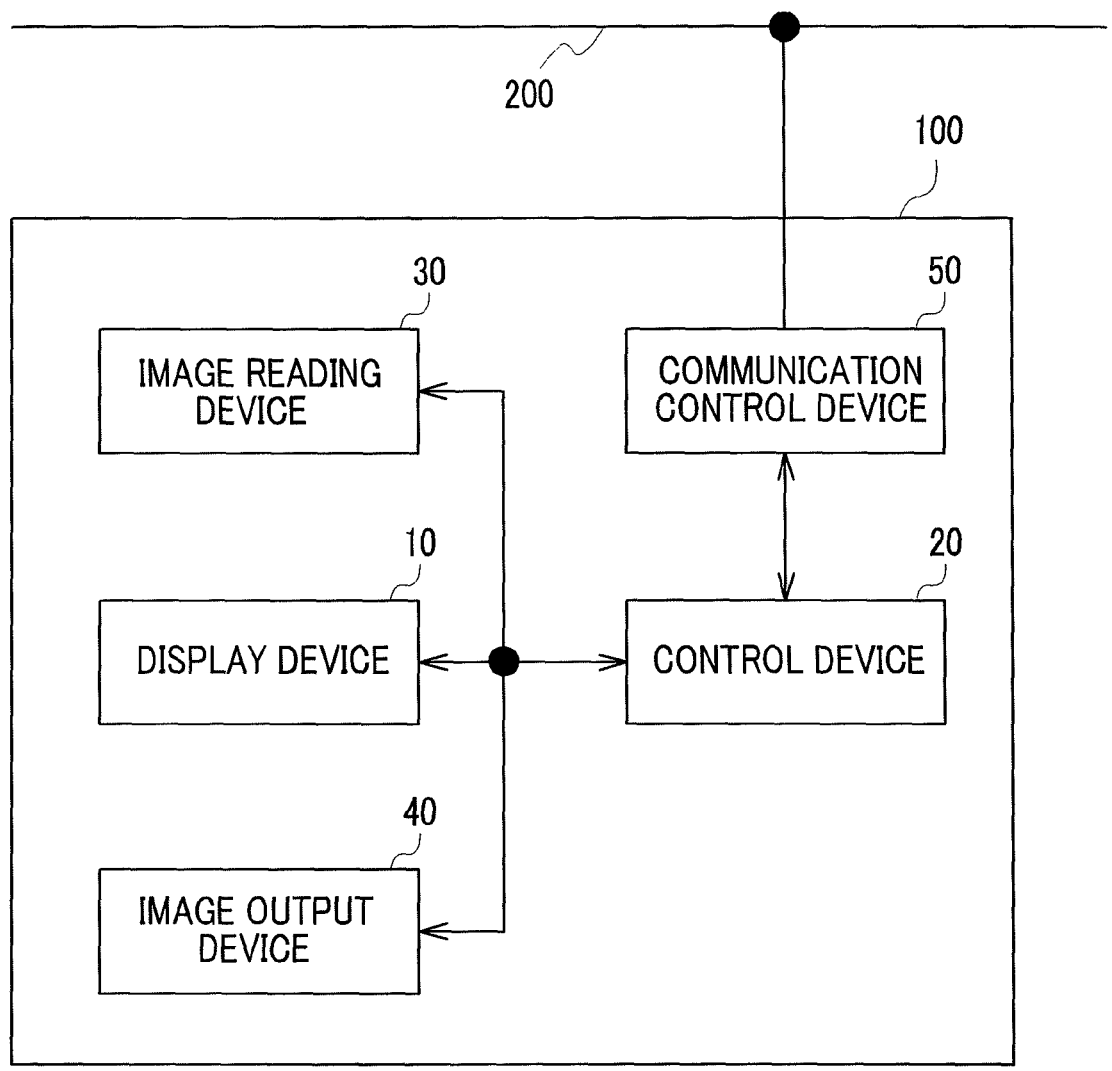
FIG. 2 is a diagram illustrating an example of the structure of the image forming apparatus.

Next, an example of the structure of the image forming apparatus 100 will be described. FIG. 2 is a diagram illustrating an example of the structure of the image forming apparatus 100. The image forming apparatus 100 includes a display device 10, a control device 20, an image reading device 30, an image output device 40, and a communication control device 50.

The display device 10 displays an operation screen that receives an operation input to the image forming apparatus 100 by the user under the control of the control device 20. Specifically, the display device 10 displays the functions (also referred to as services) of the image forming apparatus 100 and also displays a menu screen that allows the user to select a function to use. In addition, the display device 10 displays an execution screen that receives an instruction to perform the function of the image forming apparatus 100 from the user. The display device 10 outputs the received instruction to the control device 20.

The display device 10 receives a request to search for the operation screen registered in another image forming apparatus from the user. The display device 10 outputs the received search request to the control device 20. In addition, the display device 10 displays the operation screen of another image forming apparatus which is matched with the search conditions included in the received search request.

The control device 20 controls the overall operation of the image forming apparatus 100. For example, the control device 20 controls the display device 10 such that the menu screen or the execution screen is displayed on the display device 10. In addition, the control device 20 receives an instruction input to the image forming apparatus 100 from the display device 10.

The control device 20 controls the image reading device 30, the image output device 40, and the communication control device 50 of the image forming apparatus 100 on the basis of the received instruction. Specifically, for example, when receiving an instruction to read (scan) an image from the display device 10, the control device 20 controls the image reading device 30 to read a document on a platen and acquires a document image. When receiving a copy instruction from the display device 10, the control device 20 controls the image reading device 30 to read a document on the platen and acquires a document image. Then, the control device 20 controls the image output device 40 to form the acquired document image on a recording medium, such as paper, and output the recording medium. When receiving a FAX instruction from the display device 10, first, the control device 20 controls the image reading device 30 to read a document to be transmitted on the platen and acquires a document image. Then, the control device 20 controls the communication control device 50 to transmit the acquired document image to the destination designated by the display device 10.

In addition, when receiving a request to search for the operation screen registered in another image forming apparatus from the display device 10, the control device 20 communicates with another image forming apparatus through the communication control device 50 and searches for the operation screen matched with the search conditions included in the search request. For example, when receiving a request to search for the operation screen registered in another image forming apparatus from the display device 10, the control device 20 of the image forming apparatus 100-1 communicates with the image forming apparatuses 100-2 to 100-n and searches for the operation screen matched with the search conditions. Then, the control device 20 controls to display the operation screen which is registered in another image forming apparatus and is matched with the search conditions on the display device 10.

The image reading device 30 is, for example, a scanner. The image reading device 30 reads a document on the platen and outputs the read document image to the control device 20 under the control of the control device 20.

The image output device 40 forms the document image read by, for example, the image reading device 30 on a sheet and outputs the sheet under the control of the control device 20.

The communication control device 50 transmits, for example, the document image, which is a transmission target, to the destination designated by the display device 10 under the control of the control device 20. When the control device 20 receives a request to search for the operation screen registered in another image forming apparatus, the communication control device 50 communicates with another image forming apparatus connected to the image forming apparatus 100 through the communication unit 200 and searches for the operation screen matched with the search conditions. In addition, the communication control device 50 receives the information of the operation screen matched with the search conditions from another image forming apparatus and outputs the information to the control device 20. The communication control device 50 outputs an instruction for another image forming apparatus which is received from the control device 20 to another image forming apparatus through the communication unit 200.

Figure 3:
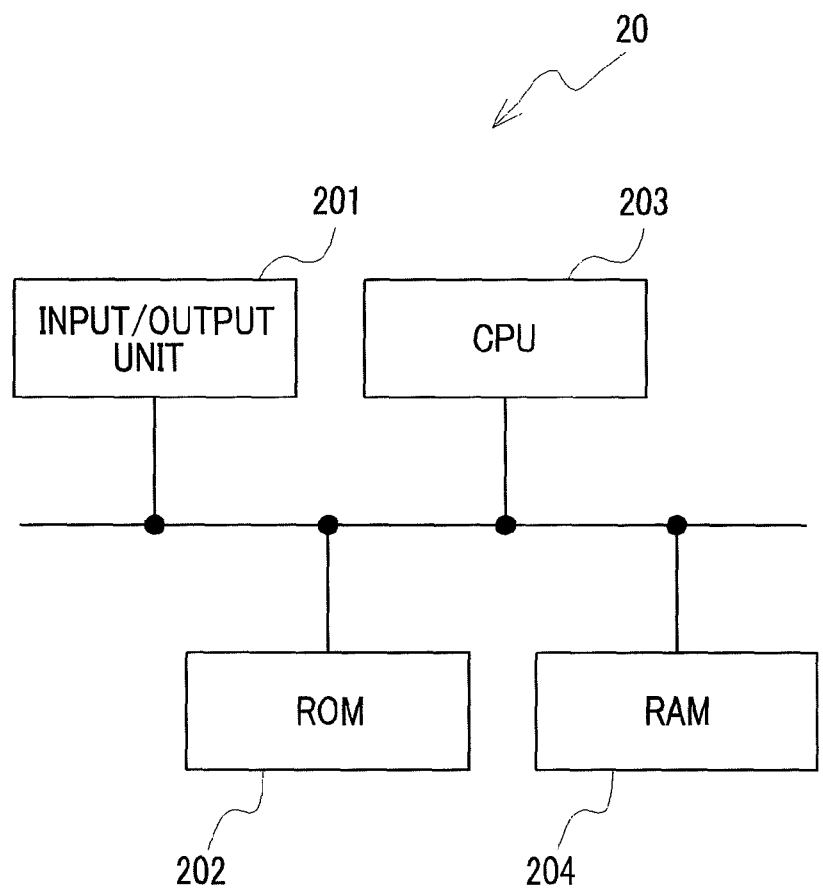
FIG. 3 is a diagram illustrating an example of the hardware structure of a control device.

Next, the hardware structure of the control device 20 will be described. FIG. 3 is a diagram illustrating an example of the hardware structure of the control device 20.

The control device 20 includes an input/output unit 201, a ROM (Read Only Memory) 202, a CPU 203, and a RAM (Random Access Memory) 204.

The input/output unit 201 transmits or receives data to or from the display device 10, the image reading device 30, the image output device 40, and the communication control device 50. The ROM 202 stores, for example, a program for searching for the screen registered in another image forming apparatus. The CPU 203 reads the program stored in the ROM 202 and executes the program. The RAM 204 temporarily stores data used to execute the program.

Next, an example of the function of the control device 20 will be described. FIG. 4 is a functional block diagram illustrating the function of the control device 20. The control device 20 includes a search request receiving unit 211, a search unit 212, a display control unit 213, a receiving unit 214, and a transmitting unit 215. In the following description, it is assumed that the user uses the image forming apparatus 100-1.

The CPU 203 executes the program stored in the ROM 202 to implement the functions of the search request receiving unit 211, the search unit 212, the display control unit 213, the receiving unit 214, and the transmitting unit 215.

The search request receiving unit 211 receives a search request from the user through the operation screen displayed on the display device 10. Specifically, the search request receiving unit 211 receives a search request to search for the operation screens registered in the image forming apparatuses 100-2 to 100-n other than the image forming apparatus 100-1 from the user. The search request includes search conditions. For example, the search request receiving unit 211 receives a search request to search for the same menu screen as that which is registered in the image forming apparatus 100-1 and is being currently displayed on the display device 10 from the other image forming apparatuses 100-2 to 100-n. In this case, the "same menu screen as that which is registered in the image forming apparatus 100-1 and is being currently displayed on the display device 10" corresponds to the search condition.

Alternatively, the search request receiving unit 211 receives a search request to search for a menu screen including the functions that may be selected from the menu screen of the image forming apparatus 100-1 which is being currently displayed on the display device 10 from the other image forming apparatuses 100-2 to 100-n. Alternatively, the search request receiving unit 211 receives a search request to search for a function execution screen (hereinafter, referred to as an execution screen) for executing the functions designated by the user from the other image forming apparatuses 100-2 to 100-n. The search request receiving unit 211 outputs the received search request to the search unit 212.

The search unit 212 receives the search request from the search request receiving unit 211. The search unit 212 searches for the operation screen matched with the search conditions included in the search request among the operation screens registered in the image forming apparatuses 100-2 to 100-n. Specifically, the search unit 212 transmits an instruction to search for the operation screen matched with the search conditions to the image forming apparatuses 100-2 to 100-n through the communication control device 50. The search unit 212 receives the search result of the image forming apparatuses 100-2 to 100-n through the communication control device 50. The search unit 212 outputs the search result to the display control unit 213.

The display control unit 213 receives the search result from the search unit 212. When one operation screen is included in the search result, the display control unit 213 controls to display the operation screen on the display device 10. When plural operation screens are included in the search result, the display control unit 213 controls to display the search result on the display device 10 such that the user selects one of the operation screens to be displayed on the display device 10. The display control unit 213 controls to display the operation screen selected by the user from the plural operation screens on the display device 10.

The receiving unit 214 receives an instruction for another image forming apparatus from the user through the operation screen that is registered in another image forming apparatus and is displayed on the display device 10. The receiving unit 214 outputs the instruction for another image forming apparatus which is received from the user to the transmitting unit 215.

The transmitting unit 215 transmits the instruction received from the user to another image forming apparatus through the communication control device 50. In this way, an instruction for another image forming apparatus (image forming apparatus 100-2) is input to the image forming apparatus 100-1 using the operation screen registered in another image forming apparatus (for example, the image forming apparatus 100-2).

Next, an example of the process of the control device 20 will be described using an example of the screen. FIG. 5 is a flowchart illustrating an example of the process of the control device 20.

First, when the user logs in through the display device 10, the control device 20 performs user authentication (Step S11).

Then, the display control unit 213 determines whether there is a function that is currently unavailable due to, for example, the error of the image forming apparatus 100 on the menu screen displayed on the display device 10 (Step S13). For example, when the menu screen only for the logged-in user is registered, the display control unit 213 determines whether there is a function that is currently unavailable on the menu screen only for the user. When the menu screen only for the logged-in user is not registered, the display control unit 213 determines whether there is a function that is currently unavailable on the initial menu screen.

When there is no function that is currently unavailable on the menu screen displayed on the display device 10 (Step S13/NO), the display control unit 213 controls to display the menu screen on the display device 10 as usual (Step S15).

Then, the display control unit 213 determines whether the user touches a portion (blank portion) in which an image for selecting the functions is not displayed in the menu screen displayed on the display device 10 (Step S17). When the user does not touch the blank portion of the menu screen (Step S17/NO), the display control unit 213 repeatedly performs the determination process of Step S17.

When the user touches the blank portion of the menu screen (Step S17/YES), as shown in FIG. 6A, the display control unit 213 controls to display a menu A for receiving a search request and the search request receiving unit 211 receives the search request from the user (Step S19). In the example shown in FIG. 6A, a menu search that requests the search of the menu screen and a service search that requests the search of the execution screen for executing a designated function (service) are displayed.

When the menu search that searches for the menu screen is selected as the search request (Step S19/menu screen search), the search request receiving unit 211 receives the function selected by the user (Step S21). For example, it is assumed that the user wants to search for the menu screen capable of selecting a "simple copy" function of performing a copy process more simply than a general copy function. In this case, the search request receiving unit 211 receives the "simple copy" function selected by the user. For example, the function selected by the user in Step S21 is not included in the image forming apparatus 100-1, but is included in the image forming apparatuses 100-2 to 100-n. Therefore, the user may use the functions included in the other image forming apparatuses 100-2 to 100-n with the image forming apparatus 100-1, without leaving the image forming apparatus 100-1.

Then, the search unit 212 searches for the menu screen on which the function received in Step S21 may be selected among the menu screens registered in the other image forming apparatuses (Step S23). Then, the display control unit 213 controls to display the search result on the display device 10 (Step S25). For example, the display control unit 213 controls to display the search result on the display device 10, as shown in FIG. 6B. For example, when the "simple copy" function is selected in Step S21 of FIG. 5, a list of the menu screens on which the "simple copy" function may be selected is displayed on the display device 10.

FIG. 6B shows an example of the search result displayed on the display device 10 of the image forming apparatus 100-1. In the example shown in FIG. 6B, the menu name of the menu screens on which the function selected in Step S21 of FIG. 5 may be selected, the name (machine name) of the image forming apparatuses in which the menu screens are registered, the owner of the menu screen, and the update date of the menu screen are displayed.

When there are plural search results, the display control unit 213 controls to display the menu screens such that the user selects the menu screen to be displayed on the display device 10 (Step S27). For example, the user selects the menu screen to be displayed on the display device 10 from the menu screens shown in FIG. 6B.

Then, the display control unit 213 controls to display the selected menu screen on the display device 10 (Step S29) and ends the process. For example, in FIG. 6B, when a menu screen "MyMenu3" registered in a machine 3 (indicating the image forming apparatus 100-3) is selected, the display control unit 213 controls to display the menu screen "MyMenu3" registered in the image forming apparatus 100-3 on the display device 10 of the image forming apparatus 100-1, as shown in FIG. 6C. In this case, the display control unit 213 may control to display information indicating that the menu screen "MyMenu3" is registered in the image forming apparatus 100-3 (machine 3). In this way, the user recognizes that the menu screen displayed on the display device 10 is for operating the image forming apparatus 100-3. When the owner of the menu screen "MyMenu3" is different from the user of the image forming apparatus 100-1, the owner of the menu screen "MyMenu3" may be displayed as, for example, a message or an icon on the screen. In the example shown in FIG. 6C, a message B indicating the image forming apparatus having the currently displayed menu screen registered therein and the owner of the menu screen is displayed on the lower right side of the screen.

When the service search that requests the search of the execution screen for executing the designated function is selected in Step S19 (Step S19/execution screen search), the search request receiving unit 211 receives the selected function that the user wants to execute (Step S31). For example, it is assumed that the user wants to execute the "simple copy" function. In this case, the search request receiving unit 211 receives the "simple copy" function selected by the user. For example, the function selected by the user in Step S31 is not included in the image forming apparatus 100-1, but is included in the image forming apparatuses 100-2 to 100-n. In this way, the user may execute the function included in the other image forming apparatuses 100-2 to 100-n with the image forming apparatus 100-1, without leaving the image forming apparatus 100-1.

Then, the search unit 212 searches for the execution screen for executing the function received in Step S31 among the execution screens registered in other image forming apparatuses (Step S33). Then, the display control unit 213 controls to display the search result on the display device 10 (Step S35). For example, the display control unit 213 controls to display the search result on the display device 10 of the image forming apparatus 100-1, as shown in FIG. 7A. For example, when the "simple copy" function is selected in Step S31 of FIG. 5, a list of the menu screens that are registered in the image forming apparatuses 100-2 to 100-n and are capable of calling out the execution screen for executing the "simple copy" function is displayed on the display device 10.

FIG. 7A shows an example of the search result displayed on the display device 10 of the image forming apparatus 100-1. In the example shown in FIG. 7A, the following are displayed: the name (service name) of the function selected in Step S31 of FIG. 5, the name (menu name) of the menu screen that is capable of calling out the execution screen for executing the function selected in Step S31 of FIG. 5, the name (machine name) of the image forming apparatus having the menu screen registered therein, the owner of the menu screen, and the update date of the menu screen.

Figure 7B:
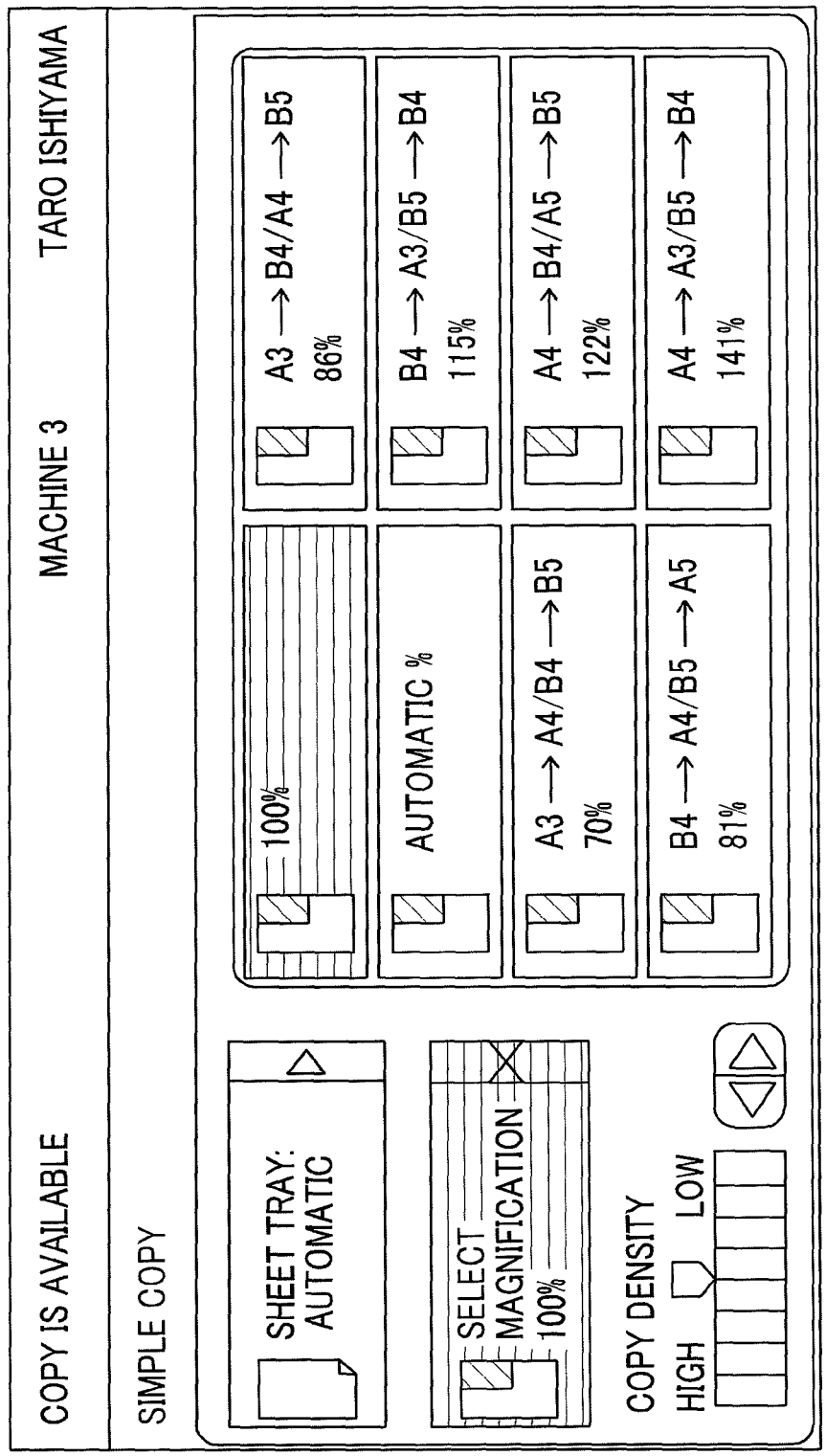

When there are plural search results, the display control unit 213 controls to display the search results such that the user selects a desired function from the execution screen registered in any one of the image forming apparatuses (Step S37). Then, the display control unit 213 controls to display the execution screen selected in Step S35 on the display device 10 (Step S39) and ends the process. For example, it is assumed that the user selects a "simple copy" function that may be called from the menu screen "MyMenu3" registered in the machine 3 in Step S35. In this case, the display control unit 213 controls to display the execution screen for executing the "simple copy" function registered in the image forming apparatus 100-3 (machine 3), which is shown in FIG. 7B, on the display device 10 of the image forming apparatus 100-1. At that time, the display control unit 213 may control to display information indicating that the execution screen displayed on the display device 10 is registered in the image forming apparatus 100-3 (machine 3) and may display the owner of the execution screen. In the example shown in FIG. 7B, information indicating that the currently displayed execution screen is registered in the image forming apparatus 100-3 (machine 3) and the owner of the execution screen is "Ishiyama Taro" is displayed on the upper right side of the screen.

When there is a function that is currently unavailable on the menu screen displayed on the display device 10 (Step S13/YES), the display control unit 213 controls to display the menu screen on the display device 10 such that the unavailable function is discriminated from other functions (Step S41). For example, as shown by the hatched area in FIG. 8A, the display control unit 213 controls to display the unavailable function so as to be discriminated from other functions. In the example of the screen shown in FIG. 8A, since the "simple copy" function is unavailable, the "simple copy" function is displayed so as to be discriminated from other functions (for example, the "simple copy" is dimmer than other functions).

Then, the display control unit 213 determines whether an unavailable function is selected by the user on the menu screen (Step S43). In the example shown in FIG. 8A, the display control unit 213 determines whether the "simple copy" function that is currently unavailable is selected on the menu screen. When the unavailable function is not selected (Step S43/NO), the display control unit 213 repeatedly performs the determination process of Step S43.

When the unavailable function is selected on the menu screen (Step S43/YES), as shown in FIG. 8B, the display control unit 213 controls to display a menu C for receiving instructions from the user on the menu screen and receives instructions from the user (Step S45). In the example shown in FIG. 8B, as the menu that may be selected by the user, the following is displayed: error information display that requests the display of the error information of an unavailable function; a menu search that requests the search of the menu screen; or a service search that requests the search of the execution screen for executing the function.

When the error information display is selected on the screen shown in FIG. 8B (Step S45/error information display), the display control unit 213 controls to display error information on the display device 10, as shown in FIG. 8C (Step S47). In this way, the user knows the reason why the selected function is not executable. In the example shown in FIG. 8C, since an error occurs in the image output device 40, the user recognizes that the "simple copy" function is not executable.

When the menu search is selected on the screen shown in FIG. 8B (Step S45/menu screen search), the search unit 212 searches for the menu screen capable of selecting the function that is currently unavailable from the menu screens registered in other image forming apparatuses (Step S23). In the example shown in FIG. 8B, since the "simple copy" function is unavailable, the search unit 212 searches for the menu screen capable of selecting the "simple copy" function from the menu screens registered in other image forming apparatuses. The process subsequent to Step S23 is the same as described above and a description thereof will not be repeated.

When the service search is selected on the screen shown in FIG. 8B (Step S45/execution screen search), the search unit 212 searches for the execution screen for executing the function that is currently unavailable in the image forming apparatus 100-1 among the execution screens registered in the other image forming apparatuses (Step S33). In the example shown in FIG. 8B, since the "simple copy" function is unavailable, the search unit 212 searches for the execution screen for executing the "simple copy" function among the execution screens registered in the other image forming apparatuses. The process subsequent to Step S33 is the same as described above and a description thereof will not be repeated.

As can be seen from the above description, according to the first exemplary embodiment, the search request receiving unit 211 receives a request to search for the operation screens registered in the other image forming apparatuses 100-2 to 100-n that are connected to the image forming apparatus 100-1. The search unit 212 searches for the operation screen matched with the search conditions included in the search request among the operation screens registered in the other image forming apparatuses 100-2 to 100-n. The display control unit 213 controls to display the searched operation screens registered in other image forming apparatuses on the display device 10 of the image forming apparatus 100-1. Then, the receiving unit 214 receives from the user an instruction for the operation screens of other image forming apparatuses displayed on the display device 10. The transmitting unit 215 transmits the instruction received from the user through the operation screens to other image forming apparatuses. In this way, the image forming apparatus 100-1 inputs an instruction to other image forming apparatuses using the operation screens registered in other image forming apparatuses. Therefore, the user does not need to move between the image forming apparatuses in order to input instructions to other image forming apparatuses. In addition, when instructions are input to other image forming apparatuses, the operation screens which are matched with the search conditions received from the user and are registered in other image forming apparatuses are used to input the instructions. Therefore, an operation screen with high operability is provided to the user. In particular, when the menu screen or the execution screen customized for each user is registered, the user changes the search conditions to search for the operation screen that the user is accustomed to. Therefore, an operation screen with high operability is provided to the user.

The search request receiving unit 211 may receive a request to search for the menu screen capable of selecting any one of the functions of the image forming apparatuses 100-2 to 100-n. In this way, an instruction to execute the functions of the other image forming apparatuses 100-2 to 100-n is input to the image forming apparatus 100-1 using the menu screens registered in the other image forming apparatuses 100-2 to 100-n. Therefore, for example, when the user wants to use the function that is not included in the image forming apparatus 100-1, but is included in other image forming apparatuses, the user does not need to move to other image forming apparatuses in order to use the function.

The search request receiving unit 211 may receive a request to search for the execution screen for executing any one of the functions of the other image forming apparatuses 100-2 to 100-n. In this way, the execution screens for executing the functions of the other image forming apparatuses 100-2 to 100-n are displayed on the display device 10 and an instruction to execute the functions of other image forming apparatuses is input to the image forming apparatus 100-1. Therefore, for example, when the user wants to use the functions of other image forming apparatuses, the user does not move to the other image forming apparatus in order to use the functions.

The search request receiving unit 211 may receive a request to search for the menu screen capable of selecting the function that is included in the image forming apparatus 100-1, but is unavailable, or an execution screen for executing the function. In this way, it is possible to input an instruction for other image forming apparatuses to the image forming apparatus 100-1. Therefore, the user does not need to move to other image forming apparatuses in order to use the function that is unavailable in the image forming apparatus 100-1. As a result, it is possible to prevent a delay in the work of the user when a specific function is unavailable in the image forming apparatus that is being used, which results in an improvement in the work efficiency of the user.

In the first exemplary embodiment, when there are plural operation screens included in the search result, the display control unit 213 controls to display the operation screen selected by the user on the display device 10. However, the display control unit 213 may control to display the operation screen that is determined on the basis of predetermined priority among plural operation screens on the display device 10.

Second Exemplary Embodiment

Next, a second exemplary embodiment will be described. The structures of an image forming apparatus and a control device according to the second exemplary embodiment are the same as those of the image forming apparatus and the control device according to the first exemplary embodiment and thus a description thereof will not be repeated. The second exemplary embodiment differs from the first exemplary embodiment in the processes of the search request receiving unit 211, the search unit 212, and the display control unit 213. Therefore, the difference between the processes of the search request receiving unit 211, the search unit 212, and the display control unit 213 according to the second exemplary embodiment and the processes of the search request receiving unit 211, the search unit 212, and the display control unit 213 according to the first exemplary embodiment will be described in detail below.

Figure 10:
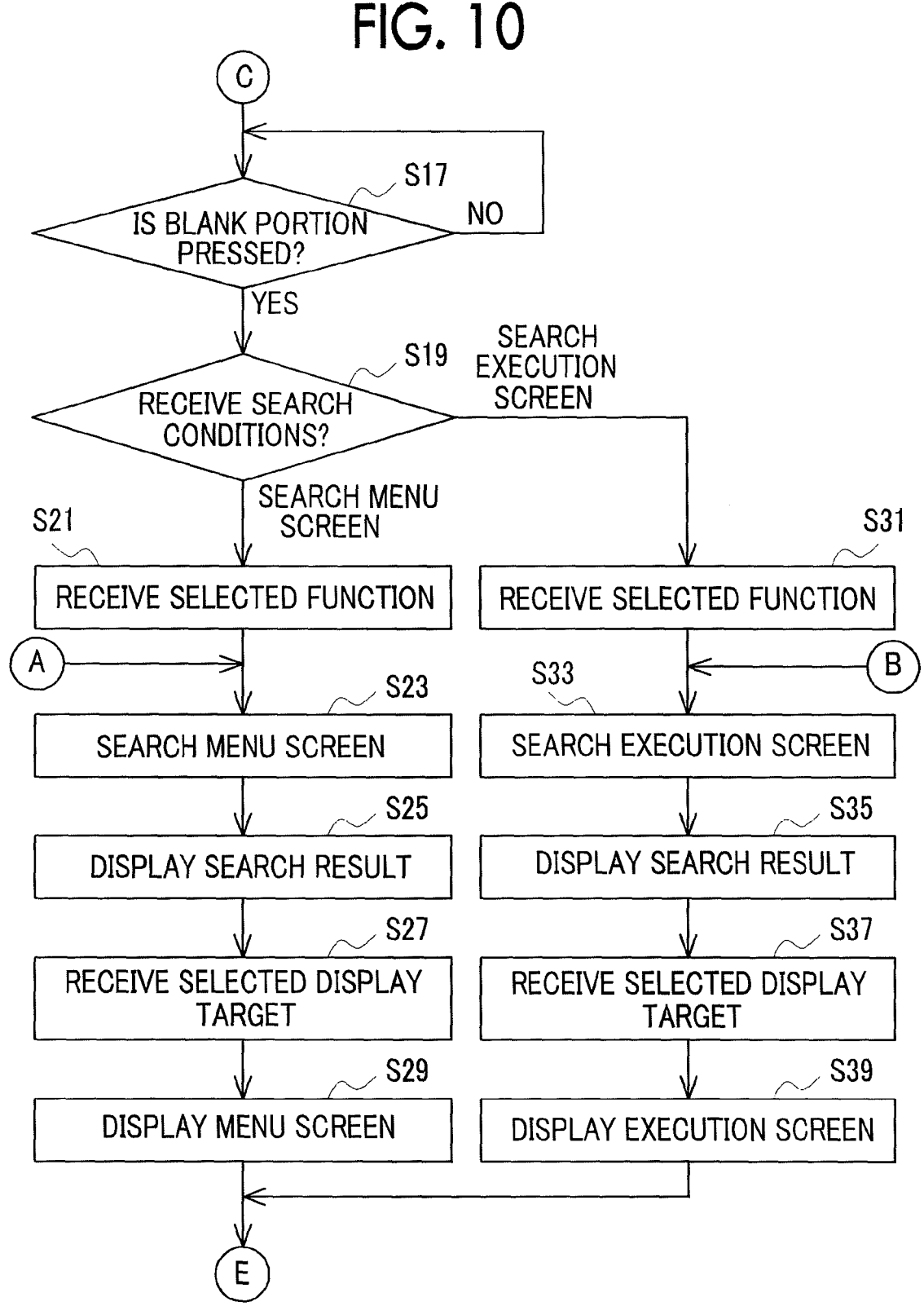
FIG. 10 is a flowchart illustrating an example of the process of the control device according to the second exemplary embodiment.

FIGS. 9 and 10 are flowcharts illustrating an example of the process of a control device 20 according to a second exemplary embodiment.

In the second exemplary embodiment, when the user logs in through the display device 10, the control device 20 performs user authentication (Step S101).

Then, the display control unit 213 determines whether there is a function to use an image reading device 30 on the menu screen displayed on the display device 10 (Step S103). For example, when the menu screen only for the logged-in user is registered, the display control unit 213 determines whether there is a function (for example, a copy or scanning function) to use the image reading device 30 on the menu screen only for the user. When the menu screen only for the logged-in user is not registered, the display control unit 213 determines whether there is a function to use the image reading device 30 on an initial menu screen.

When there is no function to use the image reading device 30 on the menu screen displayed on the display device 10 (Step S103/NO), the display control unit 213 controls to display the menu screen on the display device 10 as usual (Step S121) and performs the process from C in FIG. 10. For example, as shown in FIG. 11A, it is assumed that there is no function to use the image reading device 30 on the menu screen displayed on the display device 10. In this case, the display control unit 213 controls to display the menu screen shown in FIG. 11A on the display device 10. The process from C in FIG. 9 is the same as that described with reference to FIG. 5 in the first exemplary embodiment and thus a description thereof will not be repeated. In FIG. 9, the same processes as those shown in FIG. 5 in the first exemplary embodiment are denoted by the same step numbers.

When there is a function to use the image reading device 30 on the menu screen displayed on the display device 10 (Step S103/YES), the display control unit 213 determines whether an error, such as a failure, occurs in the image reading device (Step S105).

Figure 11B:
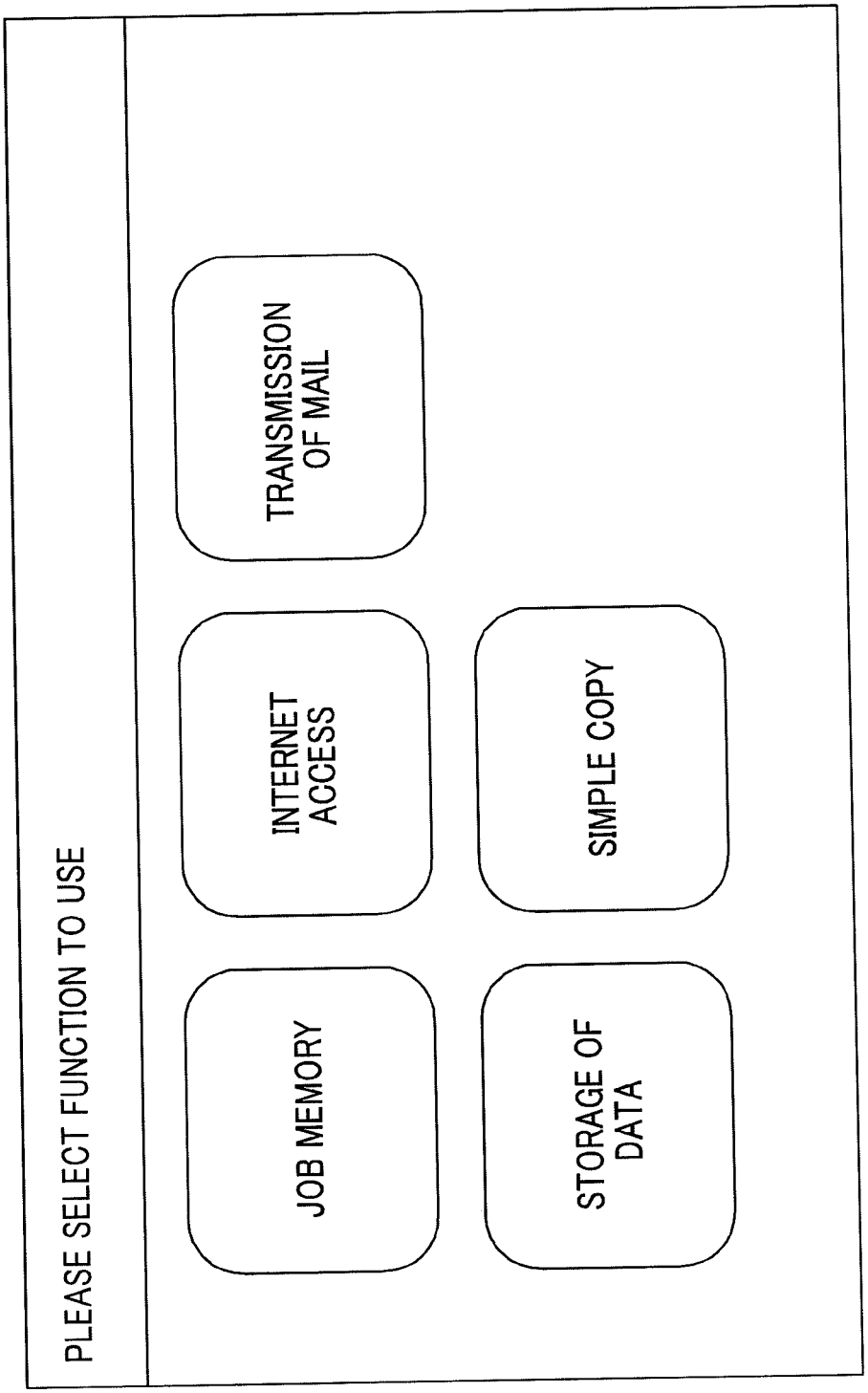

When an error, such as a failure, does not occur in the image reading device 30 (Step S105/NO), the display control unit 213 controls to display the menu screen on the display device 10 as usual (Step S123) and continuously performs the process from C in FIG. 9. For example, as shown in FIG. 11B, it is assumed that there is a function (simple copy) to use the image reading device 30 on the menu screen and no error occurs in the image reading device 30. In this case, the display control unit 213 controls to display the menu screen shown in FIG. 11B on the display device 10. The process from C in FIG. 9 is the same as that described with reference to FIG. 5 in the first exemplary embodiment and thus a description thereof will not be repeated.

When an error, such as a failure, occurs in the image reading device 30, the function to use the image reading device is unavailable in the image forming apparatus 100-1. Therefore, when an error, such as a failure, occurs in the image reading device 30 (Step S105/YES), the search unit 212 searches for another image forming apparatus in which the function that is unavailable in the image forming apparatus 100-1 due to an error occurring in the image reading device 30 is available (Step S107). Specifically, when an error, such as a failure, occurs in the image reading device 30, the search request receiving unit 211 determines that a search request to search for the execution screen for executing the function that is unavailable in the image forming apparatus 100-1 has been received. Then, the search request receiving unit 211 outputs the search request to the search unit 212. The search unit 212 searches for the image forming apparatus in which the execution screen for executing the function that is unavailable in the image forming apparatus 100-1 is registered. For example, it is assumed that a "simple copy" function is displayed as the function to use the image reading device 30 on the display device 10 of the image forming apparatus 100. In this case, the search unit 212 searches for the image forming apparatus in which the execution screen for executing the "simple copy" function is registered among the image forming apparatuses 100-2 to 100-n.

Then, the search unit 212 determines whether there is another image forming apparatus in which the function that is unavailable in the image forming apparatus 100-1 due to an error occurring in the image reading device 30 is available (Step S109). When there is not another image forming apparatus in which the function that is unavailable in the image forming apparatus 100-1 is available (Step S109/NO), the display control unit 213 controls to display the menu screen such that the user may know that the function to use the image reading device 30 is unavailable (Step S125). For example, the display control unit 213 controls to display the "simple copy" function in a format different from that of the other functions, as shown in FIG. 11C (for example, a button corresponding to the simple copy function is dimmer than the other buttons). When Step S125 ends, the process continues from D in FIG. 9. The process from D in FIG. 9 is the same as that described with reference to FIG. 5 in the first exemplary embodiment and thus a description thereof will not be repeated.

When there is another image forming apparatus in which the function that is unavailable in the image forming apparatus 100-1 is available (Step S109/YES), the display control unit 213 controls to display the search result shown in FIG. 7A on the display device 10 (Step S111).

The display control unit 213 receives from the user an operation of selecting any one of the image forming apparatuses in which the function to use the image reading device 30 is available (Step S113).

Then, the display control unit 213 controls to display the menu screen including the function that is unavailable in the image forming apparatus 100-1, as shown in FIG. 11D (Step S115). That is, it is difficult to perform the "simple copy" function in the image forming apparatus 100-1, but the display control unit 213 controls to display the "simple copy" function as usual when the "simple copy" function may be performed using another image forming apparatus. In this case, it is preferable that the display control unit 213 controls to display a message or an icon (D in FIG. 11D) such that the user may know that the "simple copy" function is performed using another image forming apparatus. In FIG. 11D, it is displayed that the "simple copy" function is performed using the image forming apparatus 100-2 (machine 2).

The display control unit 213 determines whether the function (in FIG. 11D, the "simple copy" function) that is executed using another image forming apparatus is selected on the menu screen (Step S117). When the function that is executed using another image forming apparatus is not selected (Step S117/NO), the display control unit 213 repeatedly performs the determination process of Step S117. When the function that is executed using another image forming apparatus is selected (Step S117/YES), the display control unit 213 controls to display the execution screen (for example, FIG. 7B) registered in another image forming apparatus on the display device 10 (Step S119) and ends the process.

As can be seen from the above description, according to the second exemplary embodiment, when the function that is unavailable in the image forming apparatus 100-1 is selected on the menu screen registered in the image forming apparatus 100-1, the display control unit 213 controls to display the execution screen for executing the function registered in another image forming apparatus. In this way, an instruction for another image forming apparatus may be input to the image forming apparatus 100-1. Therefore, the user does not need to move to another image forming apparatus in order to use the function that is unavailable in the image forming apparatus 100-1. As a result, it is possible to prevent a delay in the work of the user when a specific function is unavailable in the image forming apparatus that is being used, which results in an improvement in the work efficiency of the user.

In the second exemplary embodiment, Step S111 and Step S113 shown in FIG. 9 may be omitted. In this case, the display control unit 213 may determine any one of the image forming apparatuses in which the function that is unavailable in the image forming apparatus 100-1 is available on the basis of a predetermined rule.

The above-described exemplary embodiments are some of the exemplary embodiments of the invention. The invention is not limited to the above-described embodiments, but various modifications and changes of the invention may be made without departing from the scope and spirit of the invention.

In the above-described embodiments, the user uses the image forming apparatus 100-1. However, the control device 20 may be provided in any one of the image forming apparatuses 100-1 to 100-n.

The functions of the control device 20 may be implemented by a computer including, for example, a CPU, a ROM, and a RAM. In this case, a program having the content of the functions of the control device 20 described therein is provided. The computer executes the program and the functions are implemented on the computer. The program having the functions described therein may be recorded on a computer-readable recording medium.

When the program is distributed, for example, the program is recorded on a portable recording medium, such as a DVD (Digital Versatile Disc) or a CD-ROM (Compact Disc Read Only Memory), and is then provided. In addition, the program may be stored in a storage device of a server computer and then transmitted from the server computer to another computer through a network.

For example, the computer that executes programs stores the program recorded on the portable recording medium or the program transmitted from the server computer in its storage device. Then, the computer reads the program from its storage device and performs processes according to the program. The computer may directly read the program from the portable recording medium and perform the processes according to the program. In addition, the computer may sequentially receive the program transmitted from the server computer and execute the processes according to the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising:
    a search request receiving unit that receives a request to search for a first operation screen registered in a second image forming apparatus connected to a first image forming apparatus;
    a search unit that searches for the first operation screen among operation screens registered in the second image forming apparatus;
    a display control unit that controls to display the first operation screen on a display device provided in the first image forming apparatus;
    a receiving unit that receives an instruction for the second image forming apparatus having the first operation screen registered therein from a user through the first operation screen displayed on the display device; and
    a transmitting unit that transmits the instruction received from the user through the first operation screen to the second image forming apparatus having the first operation screen registered therein,
    wherein the first operation screen is an execution screen for executing a function that is unavailable in the first image forming apparatus, and
    when the function that is unavailable in the first image forming apparatus is selected on a menu screen registered in the first image forming apparatus, the display control unit controls to display the first operation screen registered on a display device provided in the second image forming apparatus.

2. The control device according to claim 1, wherein the first operation screen is a menu screen capable of selecting function that is included in the first image forming apparatus and is unavailable, or the execution screen for executing the function.

3. The control device according to claim 1, wherein the first operation screen is a menu screen capable of selecting any one of functions of the second image forming apparatus.

4. The control device according to claim 1, wherein the first operation screen is the execution screen for executing any one of functions of the second image forming apparatus.

5. A control method comprising:
    receiving a request to search for a first operation screen registered in a second image forming apparatus connected to a first image forming apparatus;
    searching for the first operation screen among operation screens registered in the second image forming apparatus;
    displaying the first operation screen on a display device provided in the first image forming apparatus;
    receiving an instruction for the second image forming apparatus having the first operation screen registered therein from a user through the first operation screen displayed on the display device; and
    transmitting the instruction received from the user through the first operation screen to the second image forming apparatus having the first operation screen registered therein,
    wherein the first operation screen is an execution screen for executing a function that is unavailable in the first image forming apparatus, and
    when the function that is unavailable in the first image forming apparatus is selected on a menu screen registered in the first image forming apparatus, displaying the first operation screen registered on a display device provided in the second image forming apparatus.

6. An image forming apparatus comprising:
    a display device that displays an operation screen; and
    a control device;
    wherein the control device includes:
    a search request receiving unit that receives a request to search for a first operation screen registered in a second image forming apparatus connected to the image forming apparatus through a communication unit;
    a search unit that searches for the first operation screen among operation screens registered in the second image forming apparatus;
    a display control unit that controls to display the first operation screen on the display device;
    a receiving unit that receives an instruction for the second image forming apparatus having the first operation screen registered therein from a user through the first operation screen displayed on the display device; and
    a transmitting unit that transmits the instruction received from the user through the first operation screen to the second image forming apparatus having the first operation screen registered therein,
    wherein the first operation screen is an execution screen for executing a function that is unavailable in the first image forming apparatus, and
    when the function that is unavailable in the first image forming apparatus is selected on a menu screen registered in the first image forming apparatus, the display control unit controls to display the first operation screen registered on a display device provided in the second image forming apparatus.

7. A non-transitory computer readable medium storing a program that causes a computer to perform:
    receiving a request to search for a first operation screen registered in a second image forming apparatus connected to a first image forming apparatus;
    searching for the first operation screen among operation screens registered in the second image forming apparatus;
    displaying the first operation screen on a display device provided in the first image forming apparatus;
    receiving an instruction for the second image forming apparatus having the first operation screen registered therein from a user through the first operation screen displayed on the display device; and
    transmitting the instruction received from the user through the first operation screen to the second image forming apparatus having the first operation screen registered therein,
    wherein the first operation screen is an execution screen for executing a function that is unavailable in the first image forming apparatus, and
    when the function that is unavailable in the first image forming apparatus is selected on a menu screen registered in the first image forming apparatus, displaying the first operation screen registered on a display device provided in the second image forming apparatus.

* * * * *